(12) United States Patent
Zhou et al.

(10) Patent No.: US 7,800,627 B2
(45) Date of Patent: Sep. 21, 2010

(54) MESH QUILTING FOR GEOMETRIC TEXTURE SYNTHESIS

(75) Inventors: Kun Zhou, Beijing (CN); Xin Huang, Beijing (CN); Xi Wang, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 689 days.

(21) Appl. No.: 11/760,607

(22) Filed: Jun. 8, 2007

(65) Prior Publication Data

US 2008/0303840 A1 Dec. 11, 2008

(51) Int. Cl.
*G09G 5/00* (2006.01)
*G06T 17/00* (2006.01)
*G06F 15/00* (2006.01)

(52) U.S. Cl. ........................ 345/582; 345/423; 345/428; 345/585; 382/285

(58) Field of Classification Search ......... 345/418–421, 345/423, 428, 581–582, 584, 585, 587, 619; 382/254, 285, 276, 282
See application file for complete search history.

(56) References Cited

U.S. PATENT DOCUMENTS

| | | | |
|---|---|---|---|
| 5,255,352 A | | 10/1993 | Falk |
| 6,362,819 B1 * | | 3/2002 | Dalal et al. ................. 345/423 |
| 6,518,963 B1 * | | 2/2003 | Waupotitsch et al. ....... 345/419 |
| 6,750,873 B1 * | | 6/2004 | Bernardini et al. .......... 345/582 |
| 7,453,456 B2 * | | 11/2008 | Petrov et al. ................ 345/419 |
| 2002/0171644 A1 * | | 11/2002 | Reshetov et al. ............ 345/420 |
| 2006/0170695 A1 | | 8/2006 | Zhou et al. |

OTHER PUBLICATIONS

Bhat, Pravin et al., "Geometric Texture Synthesis by Example", In Eurographics Symposium on Geometry Processing, 2004, pp. 41-46.
Lagae, Ares et al., "Geometry Synthesis by Example", In Shape Modeling International, 2005, pp. 174-183.
Porumbscu, Serban et al., "Shell Maps", ACM Transactions on Graphics 23, 3, 2005, 8 pages.
Zhou, et al., "Decorating Surfaces with Bidirectional Texture Functions", IEEE Transactions on Visualization and Computer Graphics, Sep./Oct. 2005, vol. 11, Issue 5, pp. 519-528.
Zhou, et al., "Mesh Quilting for Geometric Texture Synthesis", ACM Transactions on Graphics (SIGGRAPH '06), Jul. 2006, vol. 25, Issue 3, pp. 690-697.

* cited by examiner

*Primary Examiner*—Wesner Sajous
(74) *Attorney, Agent, or Firm*—Lee & Hayes, PLLC

(57) ABSTRACT

Mesh quilting for geometric texture synthesis involves synthesizing a geometric texture by quilting a mesh texture swatch. In an example embodiment, geometry is matched between a mesh texture swatch and a portion of a synthesized geometric texture. Correspondences are ascertained between elements of the mesh texture swatch and the portion of the synthesized geometric texture. The ascertained corresponding elements of the mesh texture swatch and the portion of the synthesized geometric texture are aligned via local deformation to create a new patch. The new patch is merged into an output texture space to grow the synthesized geometric texture.

20 Claims, 19 Drawing Sheets

MESH QUILTING FOR GEOMETRIC TEXTURE SYNTHESIS

BACKGROUND

When computers first started displaying graphics, the visual graphics were rudimentary. They tended to be limited to lines and then combinations of lines and blocks. Over time, the capability of computers to display graphics has increased significantly. Computers can now display three-dimensional (3D) graphics and textures.

In fact, computer-generated graphics are becoming more and more realistic. One relatively-modern approach to generating realistic-looking graphics involves applying two-dimensional (2D) images to 3D objects. The result can be impressive compared to the rudimentary lines and blocks of the past. However, this approach still fails to provide photo-realistic graphics, especially when motion is added to a visual scene.

SUMMARY

Mesh quilting for geometric texture synthesis involves synthesizing a geometric texture by quilting a mesh texture swatch. In an example embodiment, geometry is matched between a mesh texture swatch and a portion of a synthesized geometric texture. Correspondences are ascertained between elements of the mesh texture swatch and the portion of the synthesized geometric texture. The ascertained corresponding elements of the mesh texture swatch and the portion of the synthesized geometric texture are aligned via local deformation to create a new patch. The new patch is merged into an output texture space to grow the synthesized geometric texture.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. implementations are described herein.

BRIEF DESCRIPTION OF THE DRAWINGS

The same numbers are used throughout the drawings to reference like and/or corresponding aspects, features, and components.

FIGS. 5A-1 and 5B-1 illustrate a first example of a mesh texture swatch and a synthesized geometric texture onto a planar surface, respectively.

FIGS. 5A-2 and 5B-2 illustrate a second example of a mesh texture swatch and a synthesized geometric texture onto a planar surface, respectively.

DETAILED DESCRIPTION

Figure 1:
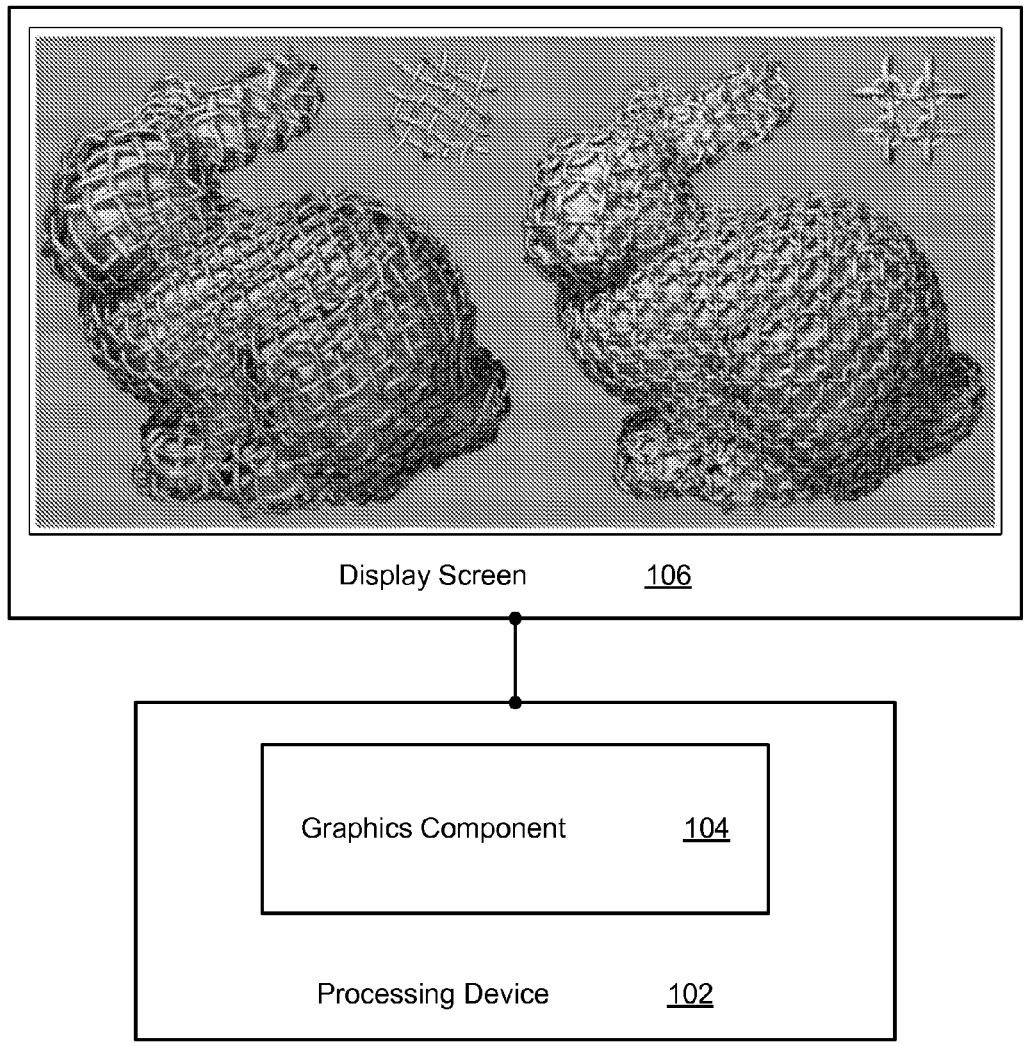
FIG. 1 is a block diagram of an example processing device having a graphics component that may be used to implement mesh quilting for geometric texture synthesis.

Introduction to Mesh Quilting for Geometric Texture Synthesis

We introduce mesh quilting, a geometric texture synthesis algorithm involving a 3D texture sample given in the form of a mesh, such as a triangular mesh. In an example embodiment, the 3D texture sample is relatively "seamlessly" applied inside a thin shell around an arbitrary surface through local stitching and deformation. Unlike pixel-based image quilting, mesh quilting is based on stitching together 3D geometry elements. A described quilting algorithm finds corresponding geometry elements in adjacent texture patches, aligns elements through local deformation, and merges elements to seamlessly connect texture patches.

For mesh quilting on curved surfaces, an issue is the reduction of distortion of geometry elements inside the 3D space of the thin shell. To address this issue, we describe an example embodiment involving a low-distortion parameterization of the shell space so that geometry elements can be synthesized even on relatively curved objects. Mesh quilting can generally be used to generate convincing decorations for a wide range of geometric textures.

From an historical perspective, caught between the drive for ever richer computer-generated scenes and the hardware limitations of polygon throughput, early computer graphics researchers developed texture mapping as an efficient means to create visual complexity while keeping the geometric complexity to a reasonable level. More general forms of textures, such as bump mapping and volumetric textures, were introduced to palliate the artifacts of image texturing, while still eliminating the tedium of modeling and rendering every 3D detail of a surface.

However, the graphics processor on today's commodity video cards has evolved into an extremely powerful and flexible processor, allowing not only real-time texture mapping, but also interactive display of tens of millions of triangles.

Thus, exquisite details can now be purely geometrically modeled and directly rendered, without generating the well-documented visual artifacts of image-based textures, such as lack of parallax, smoothed contours, and inaccurate shadows. This purely mesh-based representation of geometric details turns out to be also very desirable as it does not suffer from most of the traditional limitations of modeling, editing, and animation.

Unfortunately, modeling such complex geometric details as veins, chain mails, ivies, or weaves is still a tedious process—more so than image texture synthesis, its 2D counterpart. Whereas many 2D texture synthesis techniques have been proposed over the past few years, the problem of creating mesh-based 3D geometric textures remains challenging.

In the disclosure hereof, we thus describe example embodiments for mesh quilting to synthesize geometric details by stitching together small patches of an input geometric texture sample. Utilization of such geometric details can facilitate the design of complex geometric textures on arbitrary base meshes.

A mesh quilting implementation that seamlessly applies a 3D texture sample (e.g., given as a triangulated mesh) inside a thin shell around an arbitrary surface entails a number of difficulties as compared to traditional 2D image-based texturing. First, the input texture sample is not a regular array of pixel values but it may instead be an irregular mesh given by vertex positions and connectivity. Second, an example texture sample may be comprised of geometry elements. Each geometry element may be a small 3D object identified as a connected component in 3D. In some implementations, the integrity of these geometry elements may be maintained in the synthesized geometry texture to facilitate subsequent applications, such as interactive editing and animation. Third, when mesh quilting is performed on curved surfaces, geometry elements often exhibit severe distortion in the 3D space within the shell. A shell mapping procedure that reduces distortion may therefore be applicable in order to generate visually-pleasing geometry textures.

For example embodiments, a texture synthesis framework to produce a mesh-based geometric texture is described to decorate arbitrary meshes. A base mesh and a given 3D texture swatch are input and a geometric texture is output. The geometric texture is locally similar to the swatch everywhere and is synthesized over the base mesh. In contrast to existing texture synthesis, mesh quilting involves input geometry and output geometry that are both represented by meshes, such as triangular meshes.

Moreover, example embodiments can maintain the integrity of geometry elements in the synthesized texture so that subsequent texture editing and texture animation can be more easily performed. For stitching together geometry elements, corresponding elements in adjacent texture patches are found. The corresponding elements are aligned through local deformation, and the aligned elements are merged to connect texture patches. Geometry elements may thus be explicitly manipulated, instead of merely relying solely on manipulating image pixel values as in traditional 2D image-based texturing. For mesh quilting on curved surfaces, example embodiments for a low-distortion parameterization of the shell space are described. Geometry elements can therefore be synthesized with less visual distortion.

EXAMPLE EMBODIMENTS FOR MESH QUILTING FOR GEOMETRIC TEXTURE SYNTHESIS

1: Introduction—Example Environments and Overview

FIG. 1 is a block diagram 100 of an example processing device 102 having a graphics component 104 that may be used to implement mesh quilting for geometric texture synthesis. As illustrated, processing device 102 includes a graphics component 104 and is coupled to a display screen 106. Display screen 106 may be separate from or integrated with processing device 102.

Processing device 102 may be realized as, by way of example but not limitation, a general personal computer (e.g., notebook, desktop, portable, etc.); a client, server, or workstation computer; a television-based device; an entertainment appliance (including portable ones); a mobile phone; a gaming device; a personal digital assistant (PDA); a device otherwise described herein; some combination thereof; and so forth. An example embodiment for a processing device 102 is described herein below with particular reference to FIG. 16.

In example embodiment(s), graphics component 104 is capable of realizing one or more implementations of mesh quilting for geometric texture synthesis. An example embodiment for a graphics component 104 is described herein below with particular reference to FIG. 4. The visual results of mesh quilting for geometric texture synthesis may be presented on display screen 106.

By way of example only, a result is shown in block diagram 100 at display screen 106. A 3D bunny model is decorated with two example geometric textures using mesh quilting. On the left, a non-periodic tubular weave mesh-swatch is grown over the surface of the 3D bunny to synthesize a woven geometric texture. On the right, an even chain mail structure texture is synthesized on the 3D bunny from the chain mail swatch; the integrity of each link may be preserved in the output chain mail geometric structure.

Figure 2:
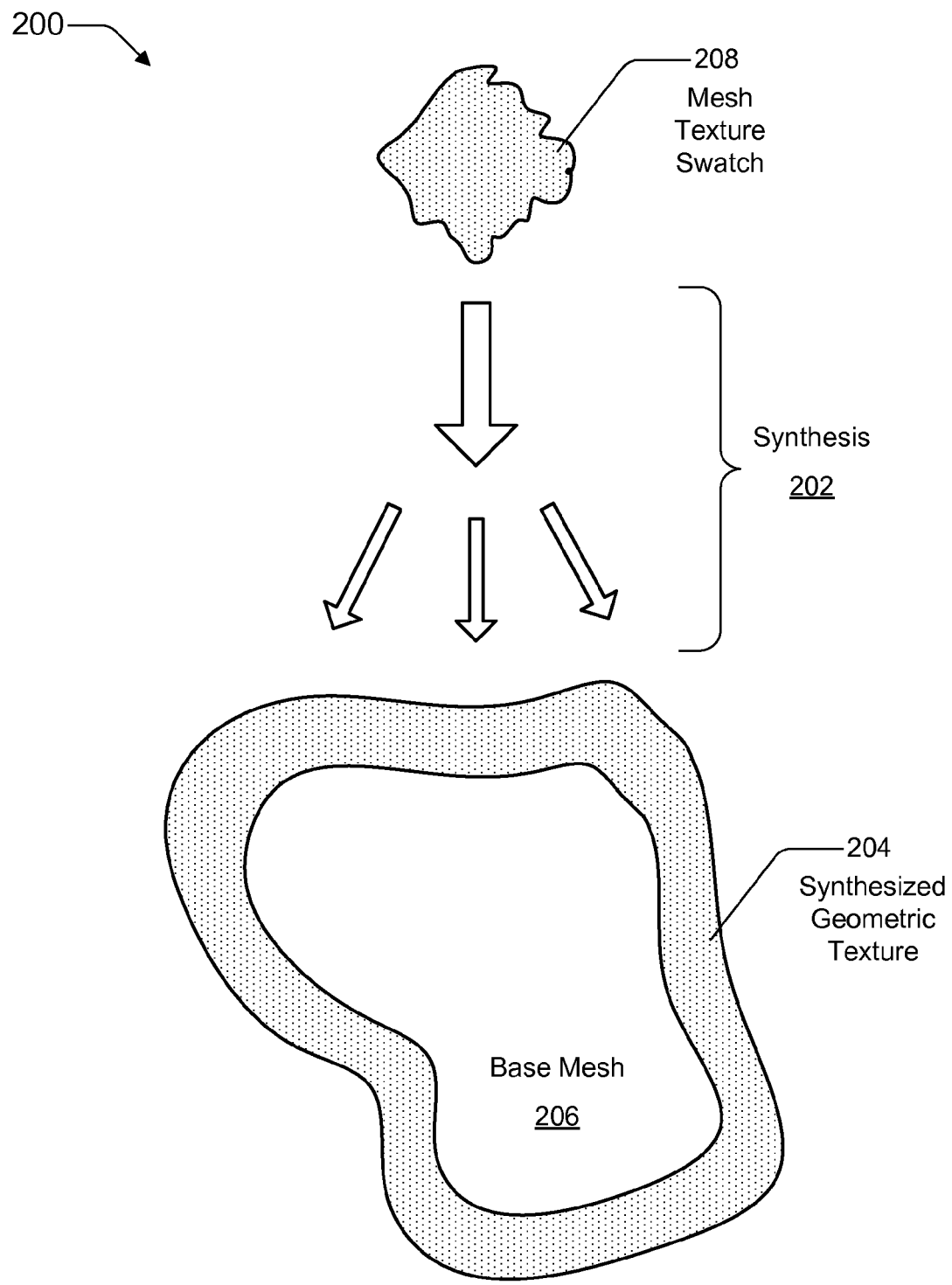
FIG. 2 is a block diagram of an example synthesis of a geometric texture over a base mesh from a mesh texture swatch.

FIG. 2 is a block diagram 200 of an example synthesis 202 of a geometric texture 204 over a base mesh 206 from a mesh texture swatch 208. As illustrated, mesh texture swatch 208 is grown over base mesh 206 to synthesize 202 geometric texture 204. In an example embodiment, mesh texture swatch 208 is a 3D swatch comprised of geometric elements. It may be, for example, a triangular mesh. Synthesized geometric texture 204 is also comprised of geometric elements. An example method for synthesis 202 is described herein below with particular reference to FIG. 3.

Figure 3:
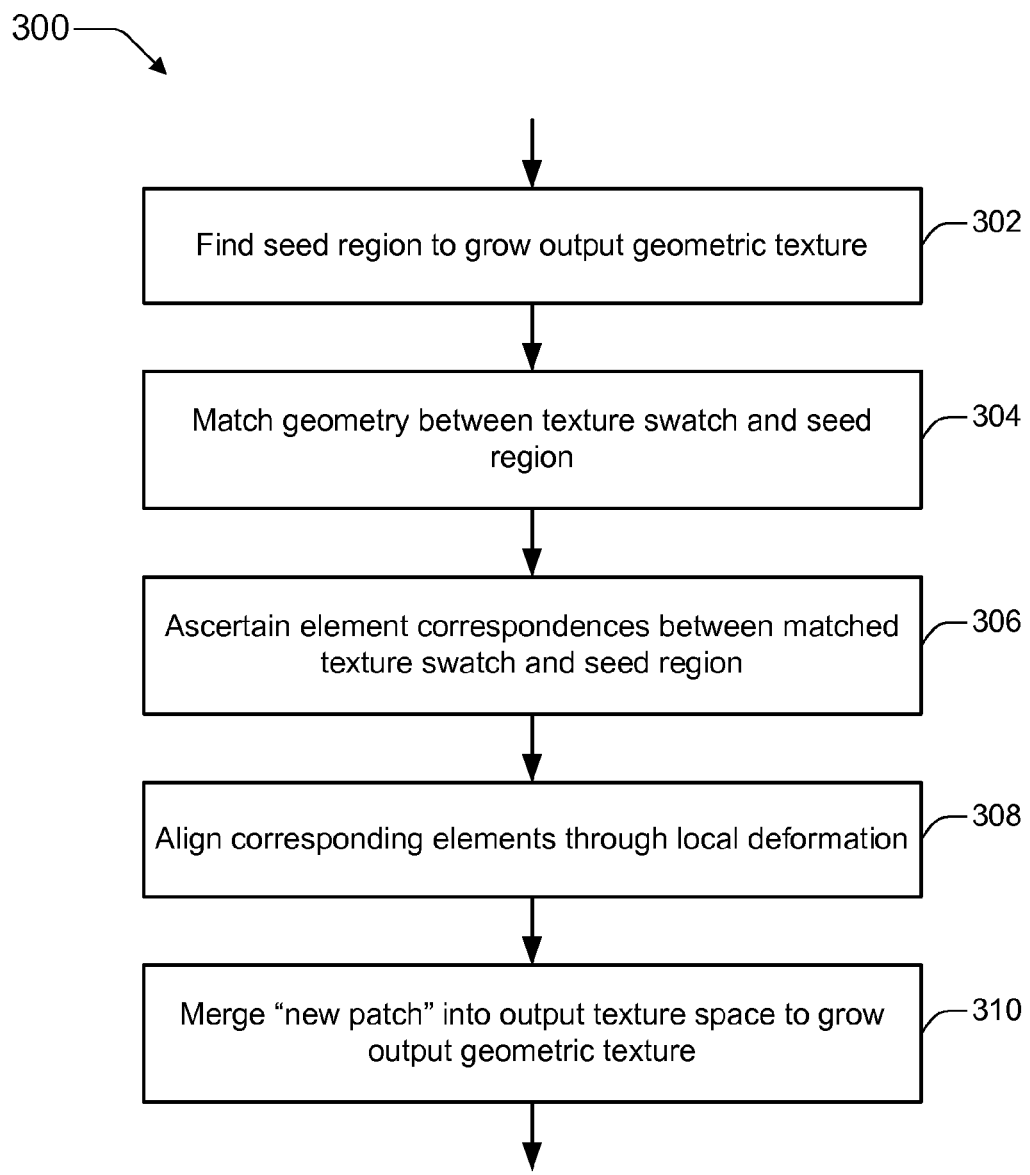
FIG. 3 is a flow diagram that illustrates an example of a method for mesh quilting for geometric texture synthesis.

FIG. 3 is a flow diagram 300 that illustrates an example of a method for mesh quilting for geometric texture synthesis. Flow diagram 300 includes five (5) blocks 302-310. Implementations of flow diagram 300 may be realized, for example, as processor-executable instructions. The actions of this flow diagram may be performed in many different environments and with a variety of devices, such as by a processing device 102 (of FIG. 1). More detailed example embodiments for implementing the flow diagram are also described further below in reference to other FIGS. in Section 2 (and Section 3). The order in which the method is described is not intended to be construed as a limitation, and any number of the described blocks can be combined, augmented, rearranged, and/or omitted to implement a respective method, or an alternative method that is equivalent thereto.

In an example embodiment, at action 302, a seed region is found to grow the output geometric texture. For example, a seed region may be selected from a partially-completed output geometric texture for a next placement of a texture swatch.

At action 304, the geometry between a texture swatch and the seed region is matched. For example, a texture swatch may be translated until a matching geometry is determined between the texture swatch and the seed region of the output geometric texture.

At action 306, element correspondences between the matched texture swatch and the seed region are ascertained. For example, elements of the matched texture swatch and elements of the seed region that correspond to one another may be ascertained.

At action 308, the corresponding elements are aligned through local deformation. For example, the elements of the matched texture swatch and the corresponding elements of the seed region may be aligned through local deformation of the elements, of either or both of the texture swatch and the output geometric texture.

At action 310, the "new patch" is merged into the output texture space to grow the output geometric texture. For example, the new patch resulting from the local deformation of the corresponding elements may be merged into the space comprising the output geometric texture.

Figure 4:
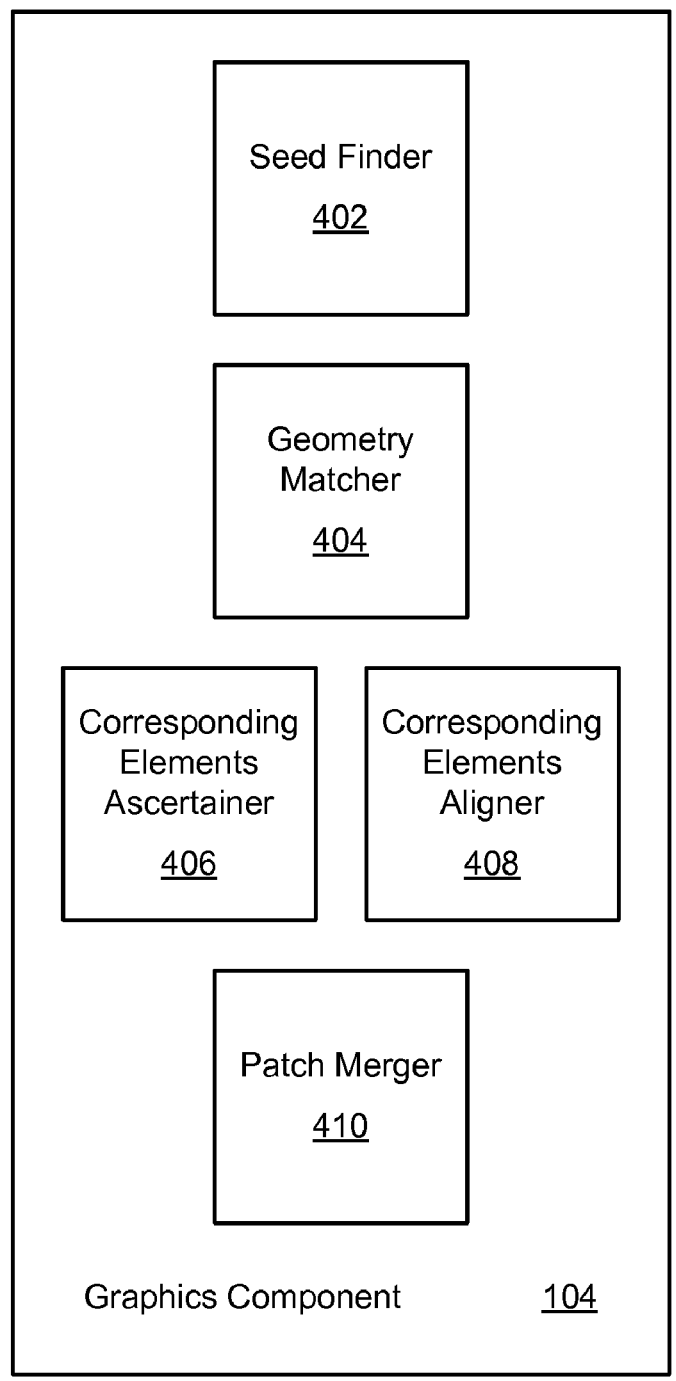
FIG. 4 is a block diagram of an example graphics component that may be used to implement mesh quilting for geometric texture synthesis.

FIG. 4 is a block diagram of an example graphics component 104 that may be used to implement mesh quilting for geometric texture synthesis. As illustrated, graphics component 104 includes a seed finder 402, a geometry matcher 404, a corresponding elements ascertainer 406, a corresponding elements aligner 408, and a patch merger 410. Graphics component 104 may be realized, for example, as software, firmware, hardware (e.g., a GPU, CPU, etc.), fixed logic circuitry, some combination thereof, and so forth. In an example embodiment, seed finder 402 may perform action(s) of finding a seed region to grow an output geometric texture. Geometry matcher 404 may perform action(s) of matching the geometry between a texture swatch and the seed region.

Corresponding elements ascertainer 406 may perform action(s) of ascertaining element correspondences between the matched texture swatch and the seed region of the output geometric texture. Corresponding elements aligner 408 may perform action(s) of aligning the corresponding elements through local deformation. Patch merger 410 may perform action(s) of merging the resulting "new patch" into an output texture space to grow the output geometric texture. Example embodiments of these various components and actions are described in greater detail herein below.

2: Mesh Quilting Synthesis

In example embodiments, geometric details may be generated on a surface by using a swatch of geometric mesh texture. The mesh texture swatch is used to create an entire "shell volume" by repeating and stitching the swatch in a relatively visually seamless manner. Generally, the swatch is an irregular, potentially high-genus mesh. Moreover, the domain upon which the geometric texture is synthesized may be non-flat. In this section, details of example embodiments of the synthesizing of such a swatch-based geometric texture are described.

For the sake of simplification and clarity, example embodiments for planar applications of a mesh swatch onto a flat base mesh are addressed in this section (e.g., in Sections 2.1-2.7). Example embodiments of mesh quilting that extend to applications of synthesizing a mesh swatch onto curved surfaces are presented subsequently in Section 3.

Figures 1, 5A:
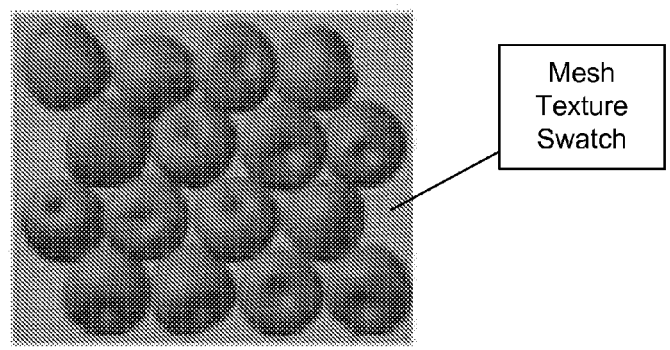
Figures 1, 5B:
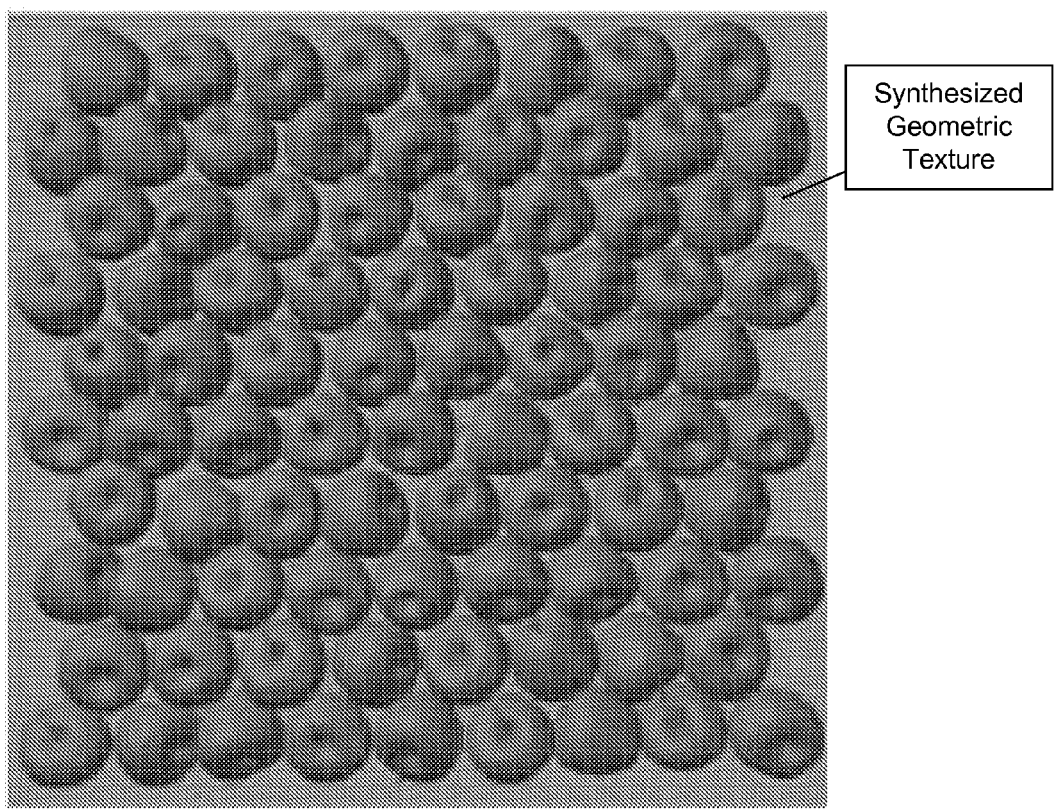
Figures 2, 5A:
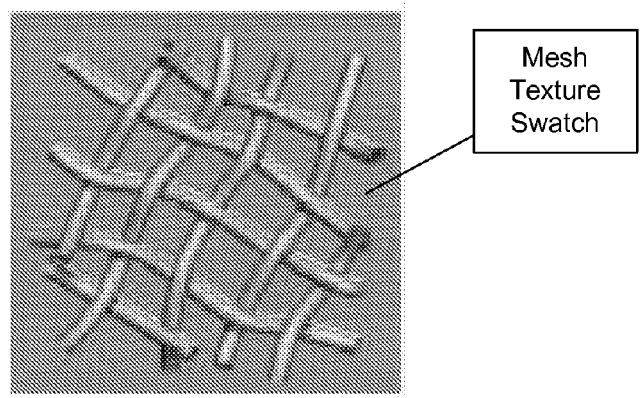
Figures 2, 5B:
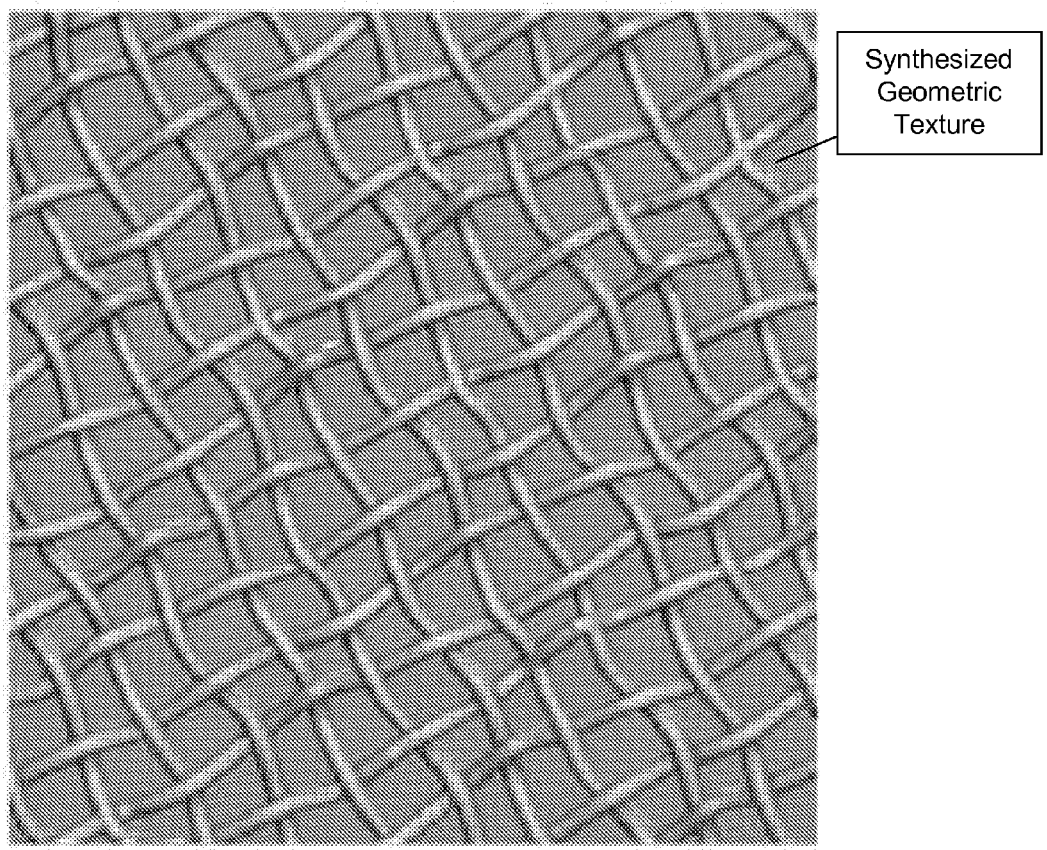

FIGS. 5A-1 and 5B-1 illustrate a first example of a mesh texture swatch and a synthesized geometric texture, respectively. A 3D mesh texture swatch of apples is quilted onto a planar surface to create a 3D synthesized geometric texture with many more apples. In an example embodiment, this mesh quilting on a flat domain starts with less than two dozen apples and generates a non-periodic, single, arbitrarily-sized layer of apples of various shapes. The various shapes result from a deformation aspect of a corresponding elements alignment phase.

FIGS. 5A-2 and 5B-2 illustrate a second example of a mesh texture swatch and a synthesized geometric texture, respectively. A 3D mesh texture swatch of interwoven webbing is quilted onto a planar surface to create a 3D synthesized geometric texture of significantly more interwoven webbing. In an example embodiment, this mesh quilting on a flat domain starts with a weave pattern and creates a dense interwoven net that can preserve the integrity of each thread.

2.1: Setup & Nomenclature

Let $M_{in}=\{V_{in}, F_{in}\}$ be the input sample mesh of geometry texture (mesh texture swatch 208 of FIG. 2), where $V_{in}$ is the set of vertex positions and $F_{in}$ is the set of triangles. Its bounding box has dimensions $l_{in} \times w_{in} \times h_{in}$, where $h_{in}$ is the smallest dimension (e.g., the thickness of the shell is smallest). We wish to synthesize a larger mesh $M_{out}$ (geometric texture 204) with bounding box $l_{out} \times w_{out} \times h_{out}$ (that we will denote as the output texture space) by growing outward the original mesh sample in order to create a seamless geometric pattern. Each connected component of $M_{in}$ or $M_{out}$ is referred to as a geometric element. With mesh quilting synthesis, the integrity of these texture elements can generally be preserved.

2.2: Mesh Quilting Synthesis Overview

Example embodiments of mesh quilting synthesis proceed such that the output texture space is filled progressively. The following five (5) phases are iterated:

1. Seed Finding: Find a seed region R from which to further grow out the output mesh texture.
2. Geometry Matching: Determine the best patch placement around region R using geometry matching to reduce, if not minimize, mismatch between the new patch and the old patch.
3. Element Correspondences: Ascertain correspondences between elements in the new patch and those in the old patch.
4. Alignment via Element Deformation: Align the corresponding elements through local deformation.
5. Element Merging: Expand the output texture by merging the modified new patch into the output texture space.

The above five phases 1-5 are described further herein below with particular reference to Sections 2.3-2.7, respectively.

Figure 6A:
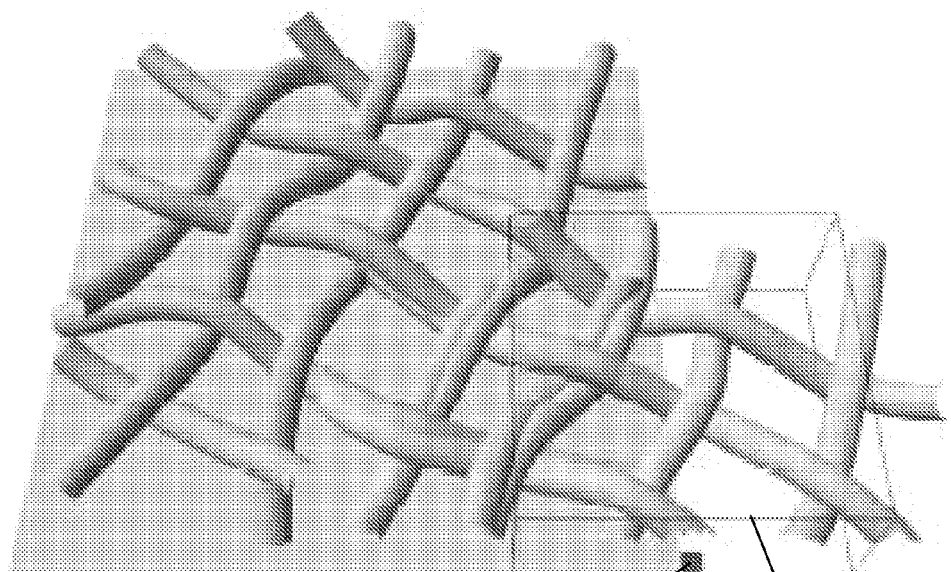
FIGS. 6A-6D illustrate examples of four different stages of mesh quilting for geometric texture synthesis with a 3D representation of a weaving pattern.
Figure 6B:
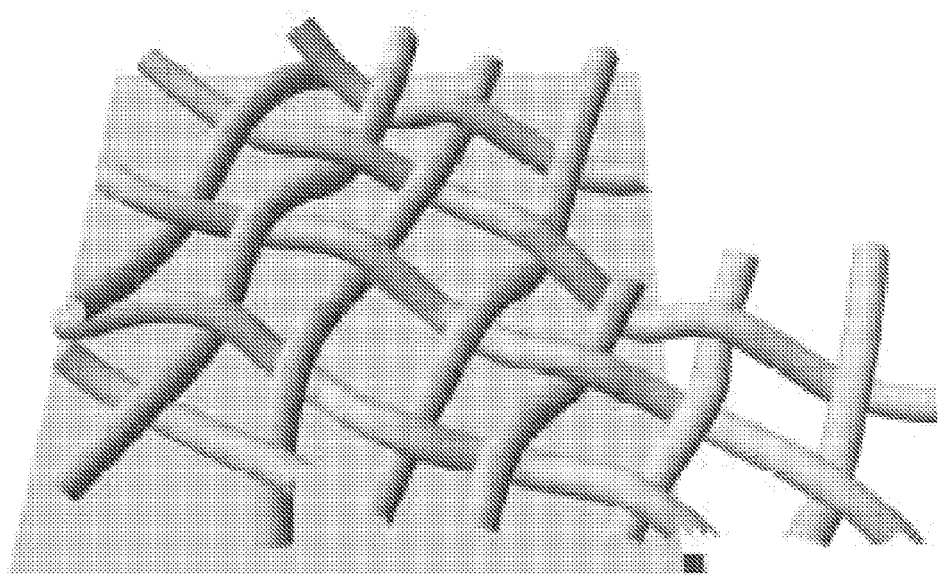
Figure 6C:
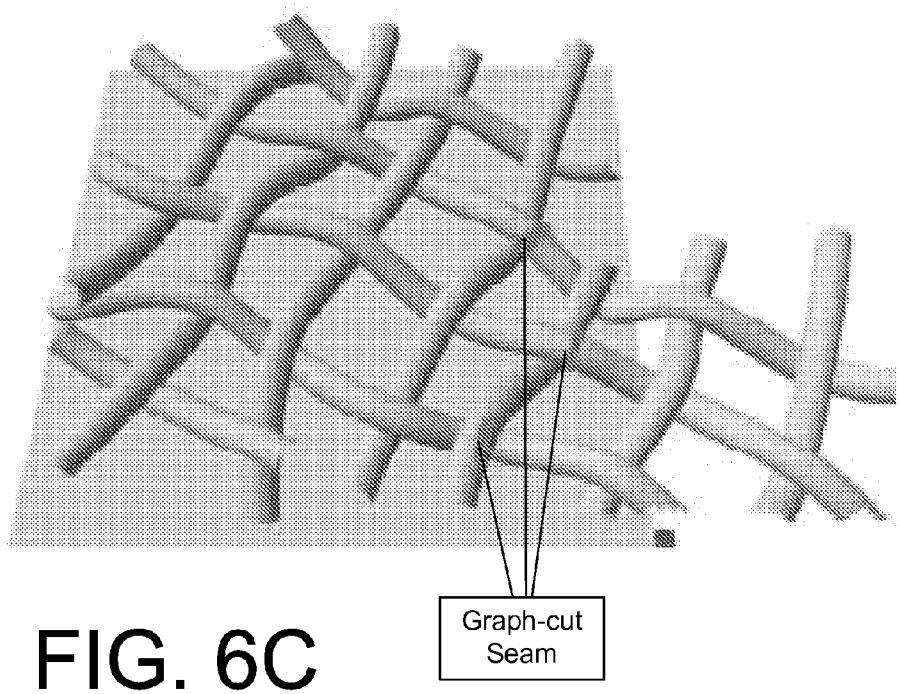
Figure 6D:
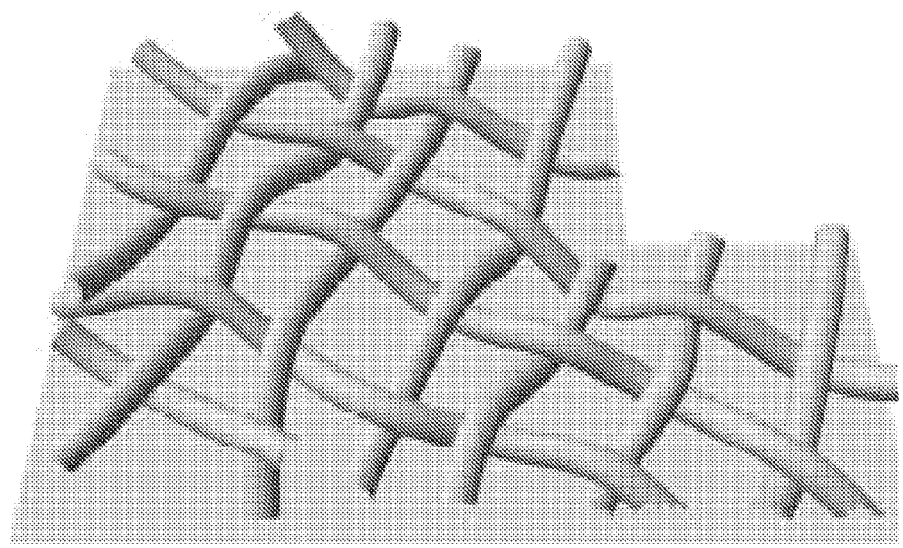

FIGS. 6A-6D illustrate examples of four different stages of mesh quilting for geometric texture synthesis with a 3D representation of a weaving pattern. For an example embodiment generally, a weaving pattern is used to illustrate: geometry matching at a seed region, element deformation, element merging, and an intermediate result. At FIG. 6A, geometry matching (phase 2) is illustrated with a seed and an output-sub-patch delimited by a bounding box. Most of the old patch is outside of the bounding box, and most of the new patch is inside the bounding box. At FIG. 6B, the alignment of corresponding elements after an element deformation (phase 4) is illustrated. At FIG. 6C, graph-cut seams are shown after an element merging (phase 5). A result of one iteration of the synthesis procedure is illustrated at FIG. 6D.

2.3: Seed Finding

Mesh textures have an irregular connectivity, so a seed finding phase is described for finding where the output mesh $M_{out}$ can effectively be extended. We use a grid-based approach. The bounding boxes of both $M_{out}$ and $M_{in}$ are subdivided into finer regular grids, of the same grid cell size, and each triangle of these two meshes is assigned to the grid cells containing it. Note that these grids may be two-dimensional; there is no need for subdividing the height of the space.

Figure 7:
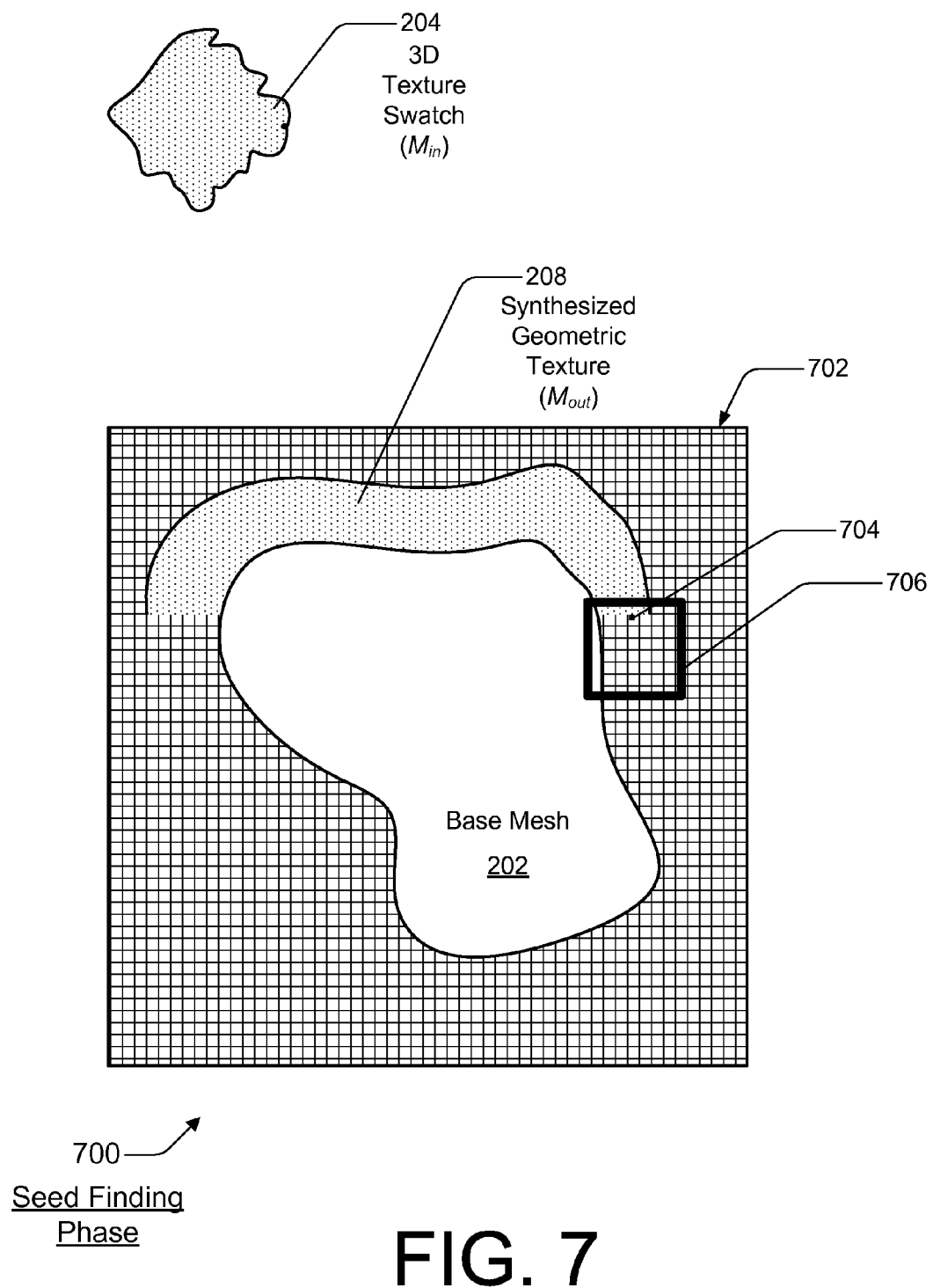
FIG. 7 illustrates example aspects of a seed finding phase of mesh quilting for geometric texture synthesis.

FIG. 7 illustrates example aspects of a seed finding phase 700 of mesh quilting for geometric texture synthesis. Texture swatch 204 is being applied to base mesh 202 to synthesize geometric texture 208. A grid 702 having multiple cells is illustrated with respect to a bounding box of the output mesh. Although the cells are shown as being rectangular, they may alternatively be other shapes. Seed 704 is shown on grid 702. An output-sub-patch 706, which is described further below with regard to geometry matching, is also shown.

Initially, the cells of $M_{out}$ are tagged unprocessed. Then, each time we wish to grow out the current mesh $M_{out}$, we look for an unprocessed cell with the largest number of adjacent cells that are already processed. This is the seed cell that is to be processed next. This cell is selected because it already contains some nearby patches of the input texture. With adjacent cells containing some patches of the input texture, the output mesh texture $M_{out}$ can be extended in a manner that is consistent with the already processed portions of the output mesh texture.

2.4: Geometry Matching

We now find how to complete the mesh texture in the seed cell, and possibly add to its surroundings too. Using the nearby existing mesh texture available near the seed cell, we find a portion of the original swatch $M_{in}$ that matches this surrounding to extend $M_{out}$. To find an appropriate placement of the swatch over the seed cell and its surroundings, we employ a sub-patch matching technique.

Figure 8:
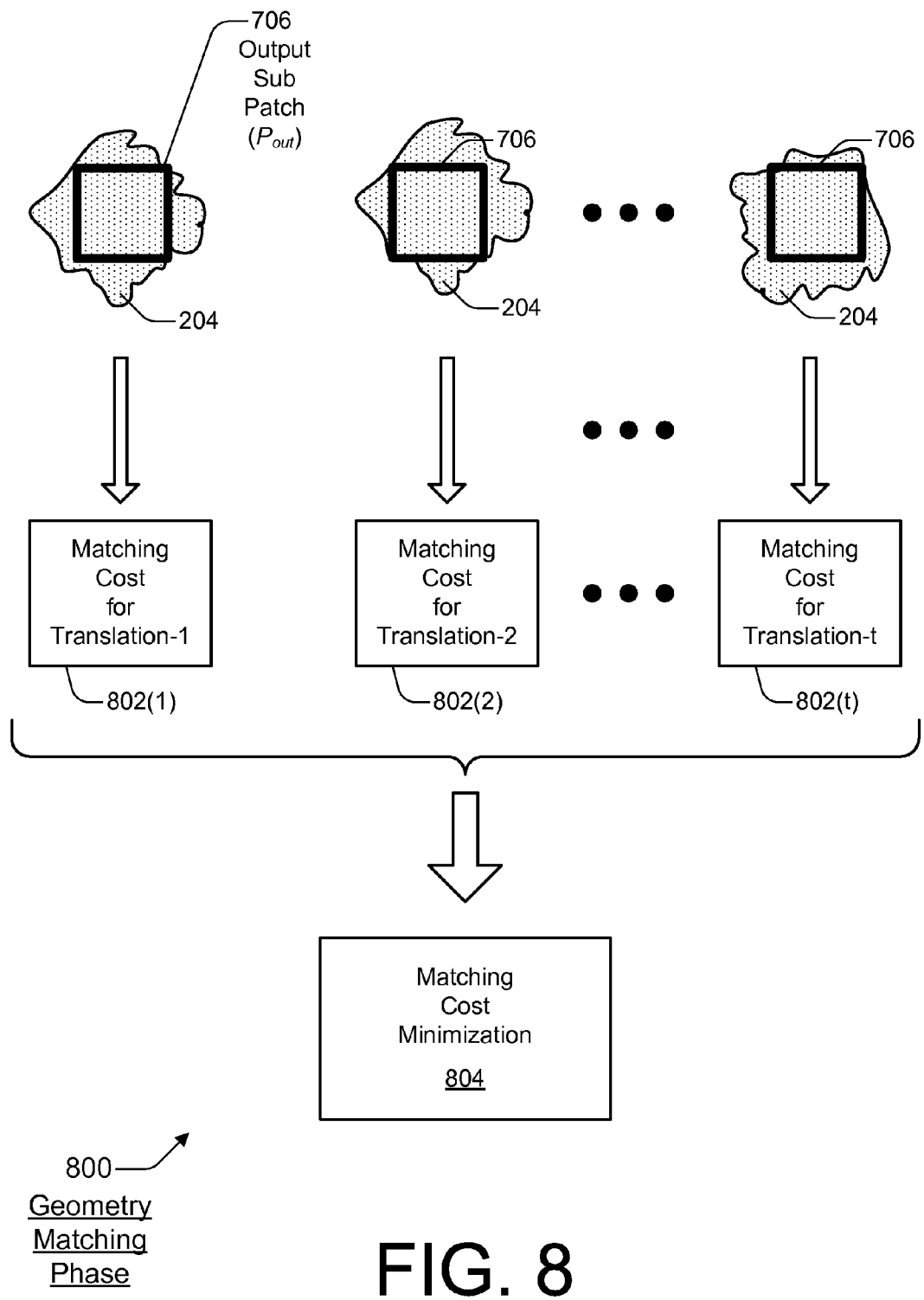
FIG. 8 illustrates example aspects of a geometry matching phase of mesh quilting for geometric texture synthesis.

FIG. 8 illustrates example aspects of a geometry matching phase 800 of mesh quilting for geometric texture synthesis. We first pick a small output-sub-patch $P_{out}$ 706. Output-sub-patch $P_{out}$ 706 includes a set of grid cells around the seed cell, but it is smaller than the input texture. We then look for translations of the input mesh texture 204 such that the portion of the input overlapping the output-sub-patch matches it "best". Translations that allow complete overlap of the output-sub-patch 706 with input 204 are considered.

Let $M_{in}(t)$ be the input geometry texture translated by t. We compute the matching cost 802(1 ... t) as the sum of distances between the output geometry $M_{out}$ and the input $M_{in}(t)$ within the overlapping region.

Suppose $f_{in}^j$ is a face of $M_{in}(t)$. For each vertex $v_{out}^i$ of the output mesh $M_{out}$ in the output-sub-patch we define the "distance" between $v_{out}^i$ and $f_{in}^j$ as a combination of geometric distance and normal difference as shown by equation (1):

$$D(v_{out}^i, f_{in}^j) = (1+\lambda Dist(v_{out}^i, f_{in}^j))(1+\|n(v_{out}^i)-n(f_{in}^j)\|), \quad (1)$$

where $Dist(v_{out}^i, f_{in}^j)$ is the shortest distance between $v_{out}^i$ and triangle $f_{in}^j$, $n(\cdot)$ is the mesh normal, and $\lambda$ is the weighting parameter. (Although it can be set to other values, the weighting parameter is set to 1 for all examples presented herein.)

The matching cost of $v_{out}^i$ with respect to $M_{in}(t)$ is then defined as the smallest $D(v_{out}^i, f_{in}^j)$ for equation (2):

$$E(v_{out}^i, M_{in}(t)) = \min_{f_{in}^j \in M_{in}(t)} D(v_{out}^i, f_{in}^j). \quad (2)$$

The face with the smallest value is denoted as $f_{in}^i$. Now we can compute the global matching cost 802 for translation t by equation (3):

$$E(t) = \sum_{v_{out}^j \in P_{out}} E(v_{out}^j, M_{in}(t)). \quad (3)$$

The minimum translation matching cost is determined at 804. Ideally, this cost is minimized over all allowed translations, but that can lead to an impractical computational time. However, the translation scope may be reduced. For example, we can restrict the translation t to be at the grid unit granularity. Such discrete translations are generally sufficient for finding a good patch placement. Although a finer discretization can be utilized to attain a better placement; the element deformation described herein below in Section 2.6 can also compensate somewhat for an imperfect element alignment. Additionally, a significant speed-up factor for the matching cost computations can be achieved by building an octree data structure for the input texture, as distances between vertices and faces can be more efficiently computed.

2.5: Element Correspondences

Once the "best" patch placement is found, we can build the correspondences between the output elements and the input elements within the overlapping region. Usually, the overlapping region is larger than the small sub-patch $P_{out}$ because the input mesh texture is to cover $P_{out}$ completely.

Figure 9:
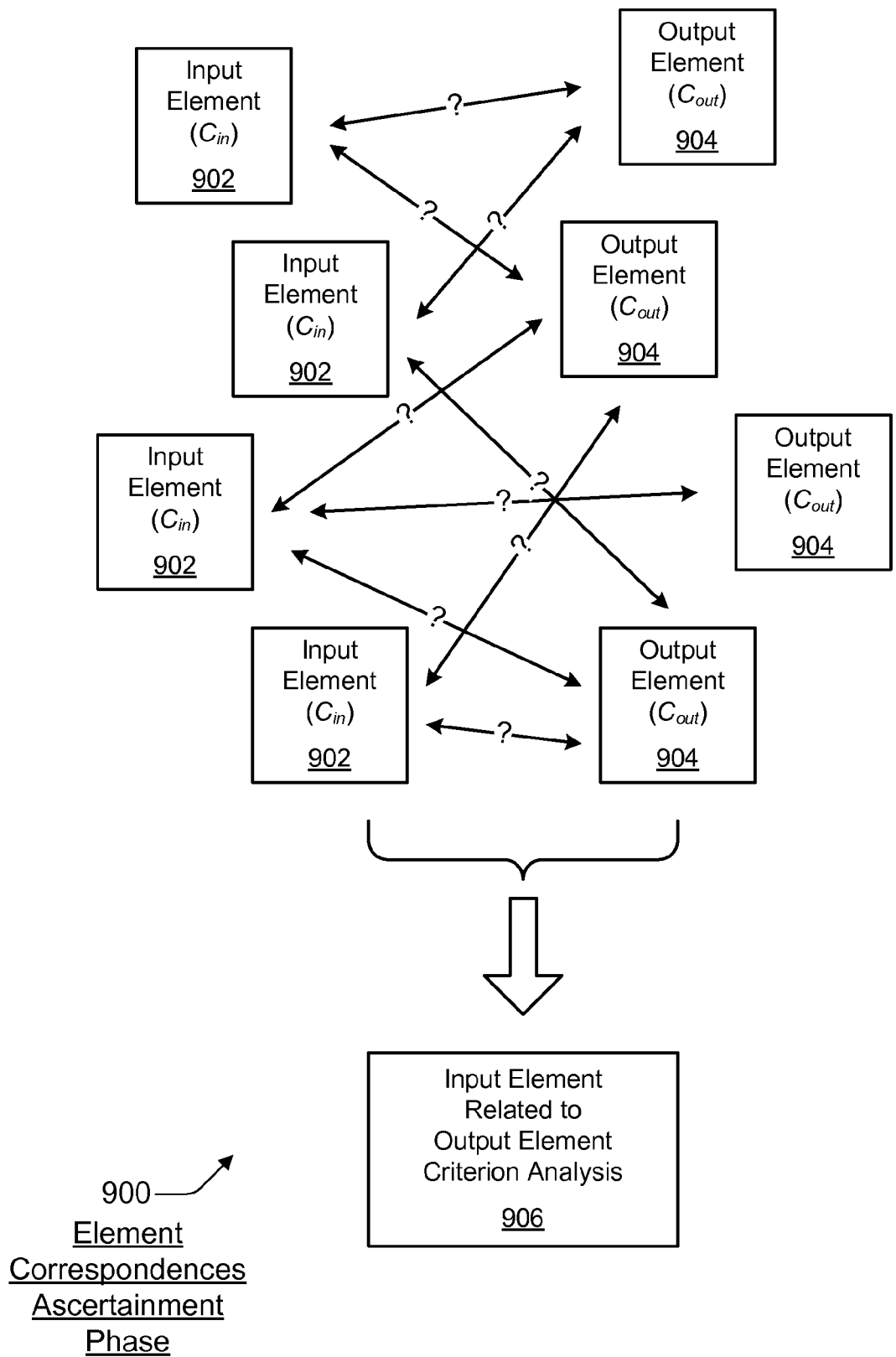
FIG. 9 illustrates example aspects of an element correspondences ascertainment phase of mesh quilting for geometric texture synthesis.

FIG. 9 illustrates example aspects of an element correspondences ascertainment phase 900 of mesh quilting for geometric texture synthesis. Multiple input elements ($C_{in}$) 902 and output elements ($C_{out}$) 904 are shown. Although only four of each are explicitly shown, there may be any number of such elements. As indicated by the lines having double arrows with question marks (?), certain input elements 902 can correspond to each output element 904. Whether a given input element 902 is related to a particular output element 904, and vice versa, depends on at least one criterion that is considered with analysis 906. An example criterion involving vertex-face pairs is described below.

We first compute the "nearest" face $f_{in}^i$ (for the distance function defined in equation (1) above) for each vertex $v_{out}^i$ in the overlapping region and collect them together as a set of vertex-face pairs ($S=\{(v_{out}^i, f_{in}^i)\}$). We then prune the pairs that readily indicate poor matching. For example, vertex-face pairs are removed if the normal of the face and its corresponding vertex normal are opposite. Also, vertex-face pairs with a distance much larger than the local edge length average of the input mesh are also dismissed.

For the remaining pair set S, we tag an output element $C_{out}$ as "related" to an input element $C_{in}$ if there exists a vertex-face pair $(v_{out}^i, f_{in}^i) \in S$ such that $v_{out}^i \in C_{out}$ and $f_{in}^i \in C_{in}$. This test can, however, create a false correspondence: an element $C_{out}$ may be tagged as related to an element $C_{in}$ even if they are far away. To remove such irrelevant correspondences, we project the triangles of both elements onto the plane and check whether the two projections overlap. If they do not overlap, we can safely remove the relationship between the two elements, and the vertex-face pairs belonging to these two elements are subsequently removed from S.

Thus, for each output element 904 within the overlapping region, we can find a set of one or more input elements 902 to which it corresponds.

2.6: Element Deformation

For each output element ($C_{out}$) 904 corresponding to an input element ($C_{in}$) 902, we now deform one or both of them in order to better align them. In addition to improving the geometric alignment between the input swatch and the current output mesh, deformation can also help to provide a smooth and relatively visually seamless extension of the output element.

Figure 10:
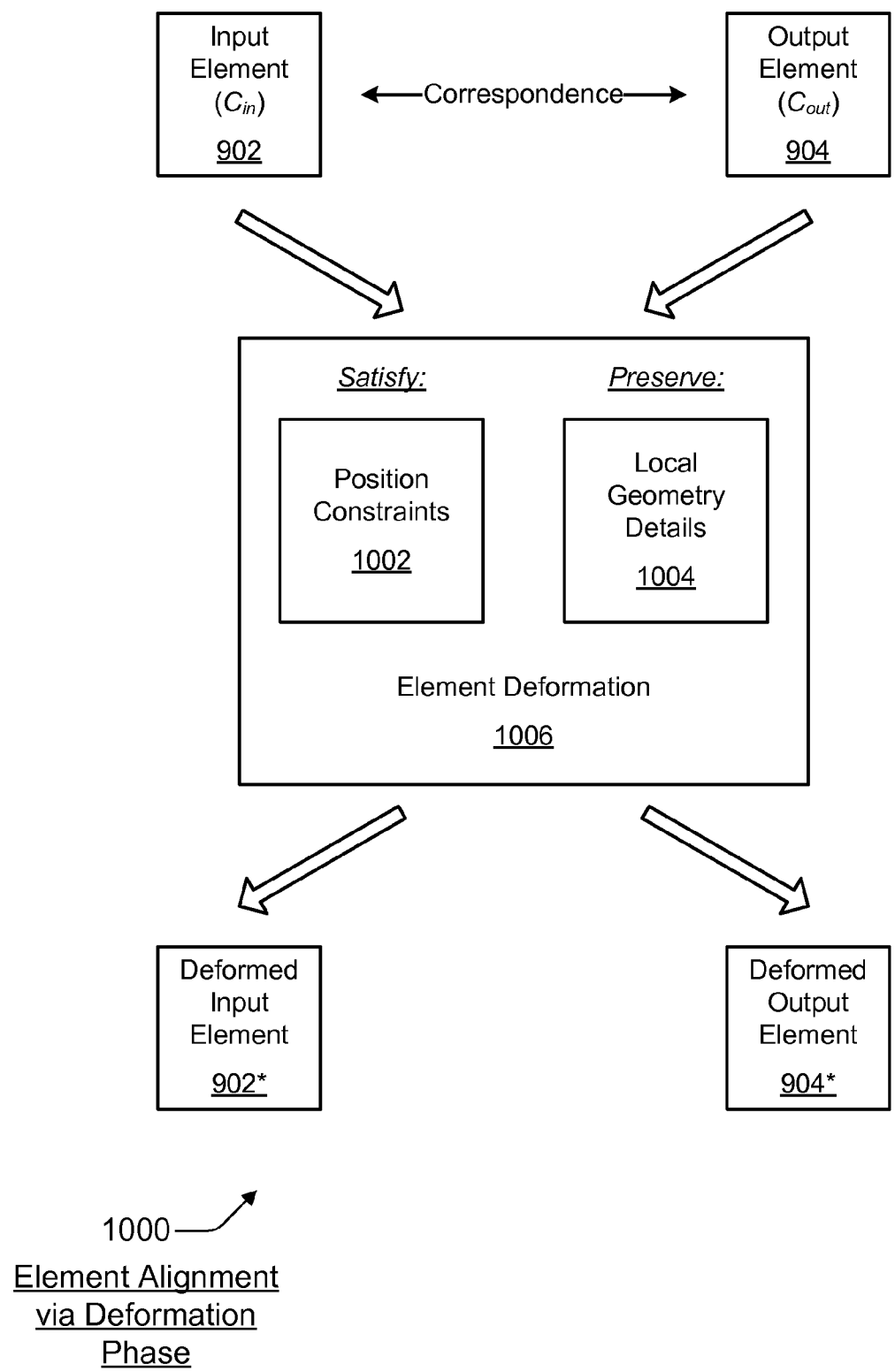
FIG. 10 illustrates example aspects of an element alignment via deformation phase of mesh quilting for geometric texture synthesis.

FIG. 10 illustrates example aspects of an element alignment via deformation phase 1000 of mesh quilting for geometric texture synthesis. An element deformation 1006 produces a deformed input element 902* and a deformed output element 904* while attempting to satisfy position constraints 1002 and to preserve local geometry details 1004.

Element deformation 1006 utilizes a Laplacian-based mesh editing technique to satisfy positional constraints 1002 while preserving local geometric details 1004. For every pair $(v_{out}^i, f_{in}^i) \in S$, we call $(v_{in}^{i,1}, v_{in}^{i,2}, v_{in}^{i,3})$ the three vertices of face $f_{in}^i$, while:

$$h_{in}^i = \alpha^i v_{in}^{i,1} + \beta^i v_{in}^{i,2} + \gamma^i v_{in}^{i,3}$$

denotes the closest point to $v_{out}^i$ in $f_{in}^i$. We also compute the Laplacian coordinates (Lap) for all vertices with equation (4):

$$Lap(v^i) = v^i - \frac{1}{\#N(v^i)} \sum_{v^j \in N(v^i)} v^j, \quad (4)$$

where $N(v^i)$ is the 1-ring vertex neighbors of vertex $v^i$, and # indicates its cardinality.

We are to compute new positions $\{p_{out}^i\}$ ($\{p_{in}^i\}$) for vertices in $C_{out}(C_{in})$. First we get the position constraints by computing the average points of the vertex-face pairs: $c^i = (v_{out}^i + h_{in}^i)/2$. The deformation is to satisfy the position constraints while preserving the local geometry details (e.g., Laplacian coordinates). For the output element $C_{out}$, this goal can be achieved, for example, by solving the following quadratic minimization problem of equation (5):

$$E_{out}(\{w^j\}) = \sum_{i=1}^{N_{out}} \|Lap(w^j) - Lap(v_{out}^i)\|^2 + \mu \sum_{i=1}^{m} \|w^i - c^i\|^2, \quad (5)$$

where the parameter $\mu$ balances the two objectives and is set to 1 by default (but other values of the parameter $\mu$ may alternatively be used).

Similarly, the vertices of $C_{in}$ can be deformed by finding the positions $\{w^i\}$ minimizing the following energy of equation (6):

$$E_{in}(\{w^j\}) = \quad (6)$$
$$\sum_{i=1}^{N_{in}} \|Lap(w^j) - Lap(v_{in}^i)\|^2 + \mu \sum_{i=1}^{m} \|\alpha^i w^{j,1} + \beta^i w^{j,2} + \gamma^i w^{j,3} - c^i\|^2.$$

The above deformation energies can be applied by extension to elements with multiple corresponding elements by collecting multiple position constraints together. We found that maintaining the original Laplacian coordinates, instead of using transformed Laplacian coordinates, can work satisfactorily in our context because we generally have to deal with small deformations to achieve a better element alignment.

2.7: Element Merging

Figure 11:
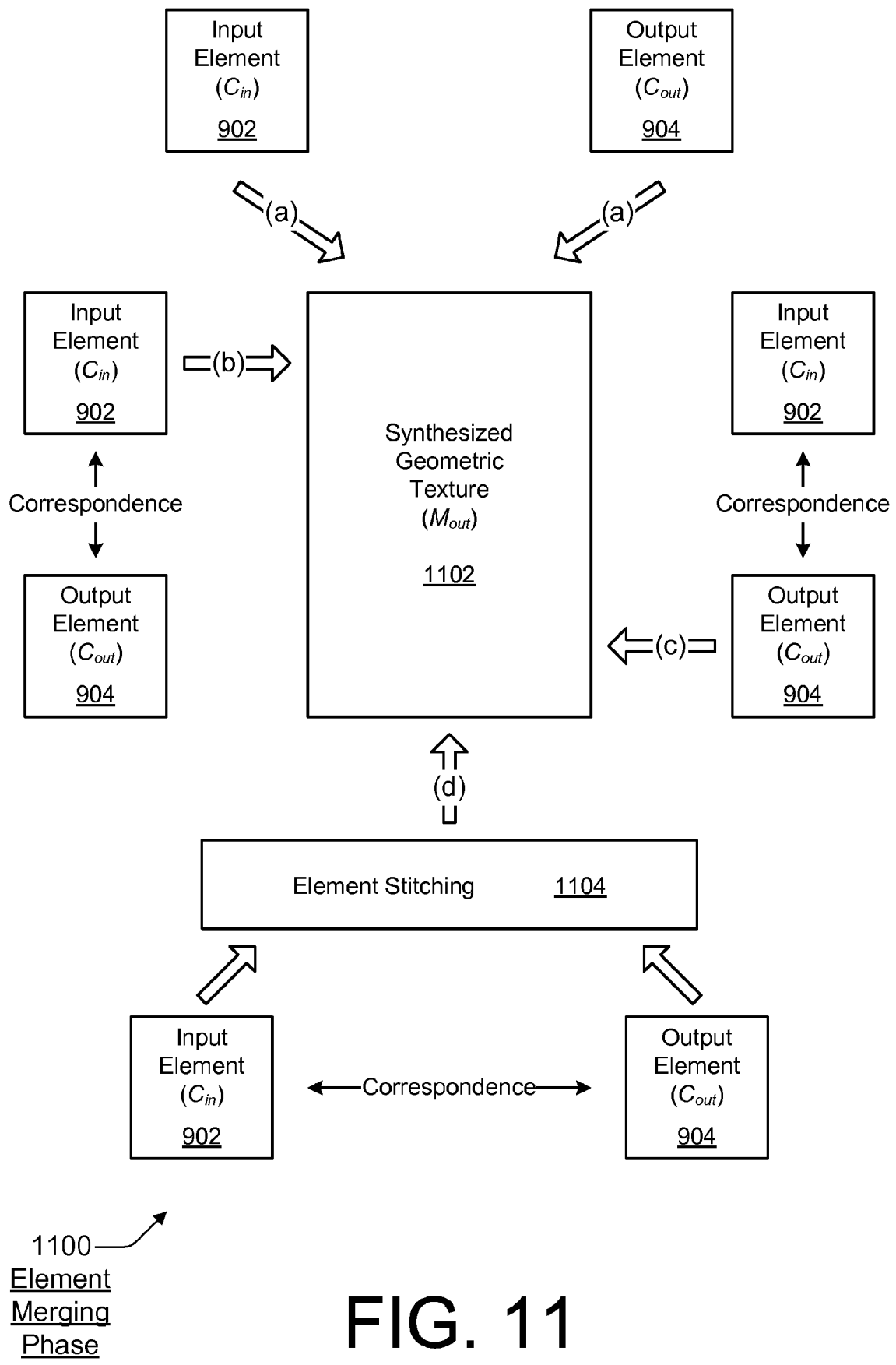
FIG. 11 illustrates example aspects of an element merging phase of mesh quilting for geometric texture synthesis.

FIG. 11 illustrates example aspects of an element merging phase 1100 of mesh quilting for geometric texture synthesis. Certain ones of the input elements 902 and/or output elements 904 are merged into the synthesized geometric texture ($M_{out}$) 1102. The merging may entail element stitching 1104, as is described below.

After element deformation, we can piece elements together to extend the current output mesh. First, every element (either from $C_{out}$ or $C_{in}$) without correspondence is directly added to $M_{out}$, as indicated at case (a). For every established correspondence ($C_{out}$, $C_{in}$), the merging proceeds as follows: If $C_{out}$ is entirely within the overlapping region, $C_{out}$ is ignored and $C_{in}$ is instead added to the final results, as indicated at case (b). Similarly, if $C_{in}$ is entirely within the overlapping region, $C_{in}$ is ignored and $C_{out}$ is added to $M_{out}$, as is indicated at case (c).

In other situations, as indicated at case (d), we stitch parts of $C_{in}$ and $C_{out}$ to get a singly-connected, combined element, and we add it to $M_{out}$. To smoothly stitch 1104 two partially overlapping elements $C_{out}$ and $C_{in}$ together, we first seek a cut path in each element such that the two cut paths are close to each other. These cut paths can be found using a graph cut algorithm using the following approach.

We first build an undirected flow network graph for $C_{out}$ representing the dual graph adjacency between triangles. The weights of this graph are set as follows: for two adjacent triangles sharing an edge $(v_{out}^i, v_{out}^j)$, a weight as given by equation (7):

$$(1 + \|v_{out}^i - v_{out}^j\|)(1 + Dist(v_{out}^i, C_{in}) + Dist(v_{out}^j, C_{in})), \quad (7)$$

is assigned to the graph edge, where $Dist(v_{out}^i, C_{in})$ is the shortest distance from $v_{out}^i$ to $C_{in}$.

Two additional nodes are added, representing the two possible choices for triangles, deleted (SINK) or undeleted (SOURCE). Triangles lying outside the overlapping region are linked to SOURCE by an edge with infinite weight, to guarantee that those triangles will not be deleted. Suppose that a vertex $v_{out}^i$ in $C_{out}$ has a closest face $f_{in}^i$ in $C_{in}$. If $f_{in}^i$ lies outside of the overlapping region or there exists a face which is adjacent to $f_{in}^i$ and does not have any corresponding vertices in $C_{out}$, then the triangles sharing vertex $v_{out}^i$ are linked to SINK with infinite weight, to guarantee this time that these triangles will be deleted. Applying a graph cut optimization algorithm to the constructed graph provides a min-cost cut which separates $C_{out}$ into disconnected parts: triangles linked to SOURCE are kept while those linked to SINK are deleted. A cut path for $C_{in}$ is found using the same approach.

Stitching 1104 together the two cut elements 902 and 904 at case (d) is performed through mesh merging. We set the average boundary points as position constraints and deform the two cut elements using the deformation energy defined in equation (5) above. The mesh connectivity of the elements is then updated to create a single connected component.

3: Mesh Quilting Over Curved Surfaces

Section 2 above focuses on mesh quilting for geometric texture synthesis on a planar surface. However, the description above can be extended so as to be applicable to curved surfaces in 3D. In this section, we describe how a relatively "seamless" quilting can be obtained on 3D surfaces using local surface parameterizations and, if desired, a guidance vector field before embedding the resulting mesh into shell-space.

Figure 12:
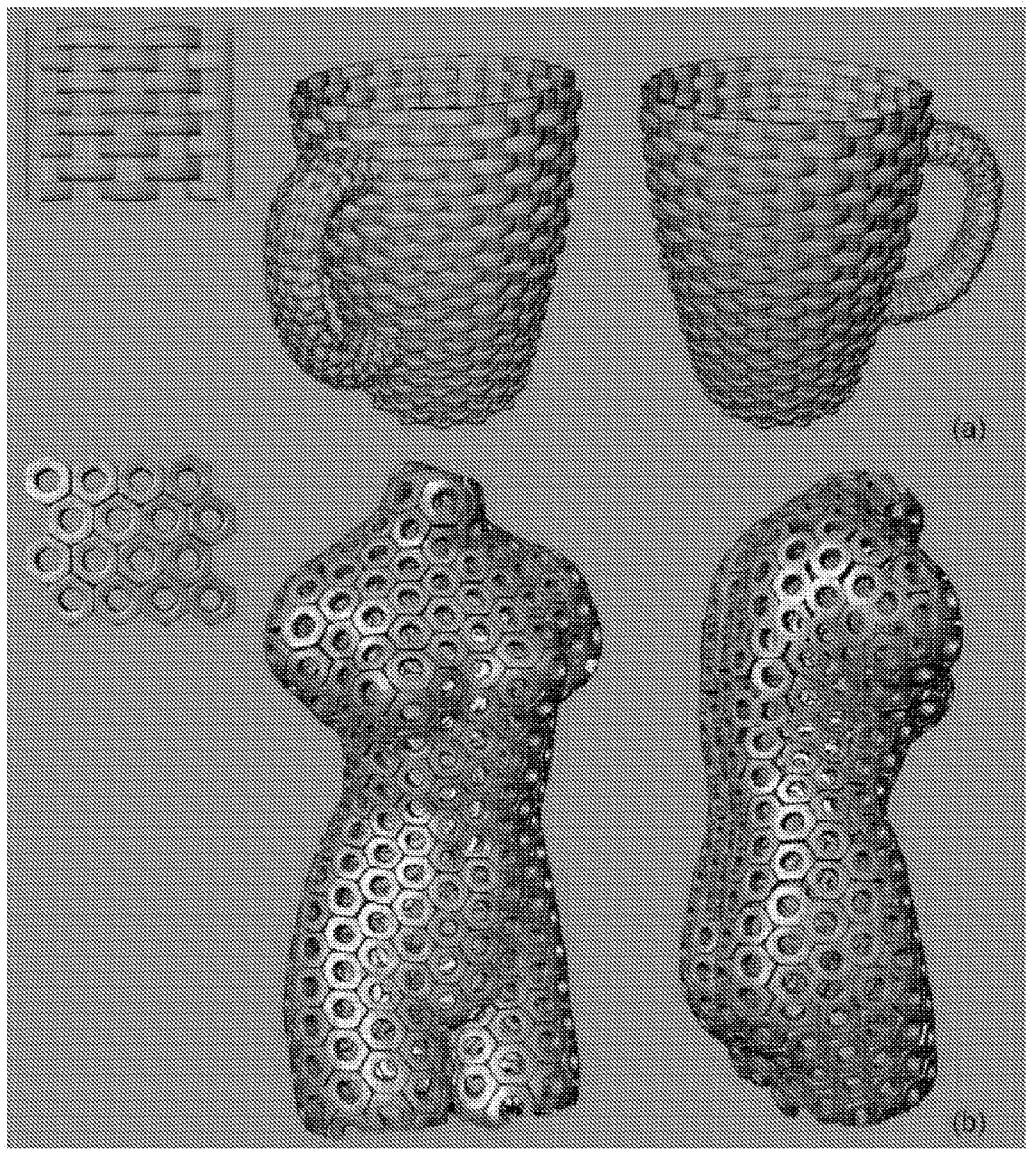
FIG. 12 illustrates examples of mesh texture swatches and respective geometric textures synthesized onto curved surfaces.

FIG. 12 illustrates examples of mesh texture swatches and respective geometric textures synthesized onto curved surfaces. The top half, part (a), shows mesh quilting results from a weave structure that is synthesized over a cup base mesh. The bottom half, part (b), shows mesh quilting results of a Venus model base mesh that is densely covered with nut elements.

3.1: Geometric Texture Synthesis on Surfaces

Setup—Let $M_{base}$ be the base mesh that we wish to enhance with added geometric details. We continue to denote as $M_{in}$ the geometric texture mesh used as a swatch that we wish to seamlessly tile the base mesh with. A parameter s is also provided to allow the user to specify the relative size of the input texture with respect to the base surface, i.e., to choose the scale of the geometric details.

From Planar to Curved—Several modifications to the description presented above in Section 2 are involved to accommodate curved domains.

First, the 2D grid used in the planar case is replaced by the base mesh itself. The quilting process is stopped when there are no more unprocessed triangles. Similarly to the 2D case, we pick the most constrained un-synthesized triangle, i.e., the cell with the most triangles synthesized in its neighborhood. We define a local surface patch by starting from the chosen triangle and growing the region using breadth-first traversal until we reach a certain depth or when the total area of the patch exceeds a user-defined threshold.

Additionally, the positions of vertices are not placed within a global coordinate system. Instead, they are located with respect to the base mesh itself. Consequently, the coordinates of the vertices of the texture output mesh may be stored as follows: the location of a vertex v over a triangle $T_{base}$ is defined by the barycentric coordinates of its orthogonal projection on $T_{base}$ along with the orthogonal distance (e.g., height) from the triangle to v.

The surface patch is flattened over the 2D plane using a discrete conformal mapping (DCM), or equivalently LSCM. Based on this parameterization, we can convert the local mesh-based representation of the part of $M_{out}$ inside this patch into an absolute representation as in the 2D case. The local operations described for planar mesh quilting can be performed over this parameterization plane, then the position of the newly synthesized vertices are re-projected onto the local mesh-based coordinate system described above. (The geometry matching phase can still restrict its search to discrete translations in this parametric domain to keep the matching cost computations to a reasonable level, if not a minimum.)

Furthermore, we also accommodate for the distortion caused by DCM in very curved regions. In an example implementation, if the area distortion induced by the local parameterization is too large (e.g., above a factor of 4), we reduce the area of the surface patch. This, in turn, decreases the size of the output-sub-patch $P_{out}$.

Using Guidance Vector Fields—One of the differences between synthesis on a planar region and synthesis on a curved surface is that synthesis on the curved region may entail controlling the orientation of the geometric texture over the surface when the swatch contains readily-apparent privileged directions. Thus, the user can be allowed to specify a vector field in order to control the direction of synthesis. We can use this field to align the direction of the grid (e.g., see Section 2.3 above) in the shell space.

3.2: Final Mesh Embedding

Using the above-described approach, we can automatically generate highly detailed geometric textures on meshes. However, harnessing the potential of such a representation involves another phase to convert the generated details into a proper mesh: the vertex positions, stored in local coordinates for now, are converted into a stand-alone, common embedding. A simple conversion to $\Re^3_3$ is, alas, not sufficient. For example, self-intersections can be created in regions of high concavity since the local coordinate frames of two adjacent triangles forming a concave angle may overlap. This is shown in FIGS. 13A and 13B.

Figure 13A:
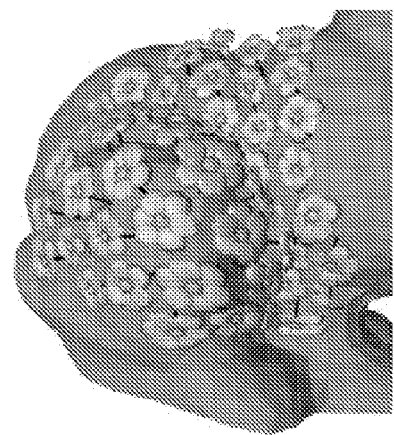
FIGS. 13A-13C illustrate examples of distorted and undistorted syntheses of geometric textures on a 3D base mesh.
Figure 13B:
Figure 13C:

FIGS. 13A-13C illustrate examples of distorted and undistorted syntheses of geometric textures on a 3D base mesh. Each figure shows a flower shell embedding on a curved surface. FIG. 13A shows a synthesis using normal displacement. FIG. 13B shows a synthesis using an original shell mapping. FIG. 13C shows an example of a low distortion shell mapping as described herein. With the synthesis result of FIG. 13C, there is a relatively even scale of the flower patterns, as well as a relatively intersection-free behavior in concave regions.

Figure 14A:
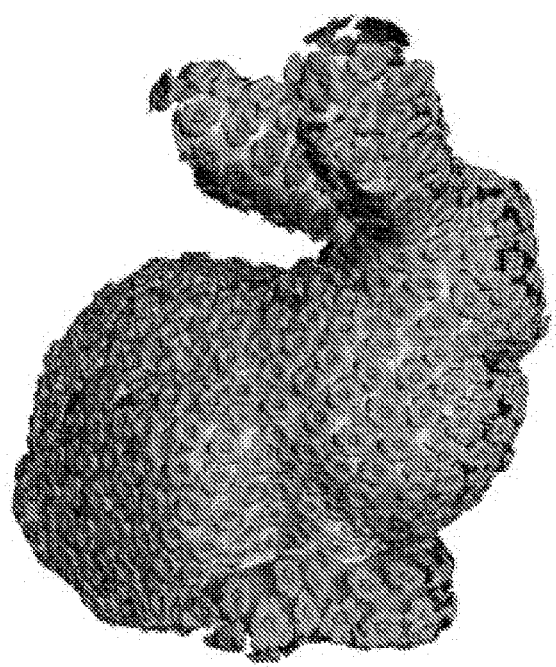
FIGS. 14A and 14B illustrate an example base bunny mesh parameterized over a low-distortion multi-chart texture atlas.
Figure 14B:
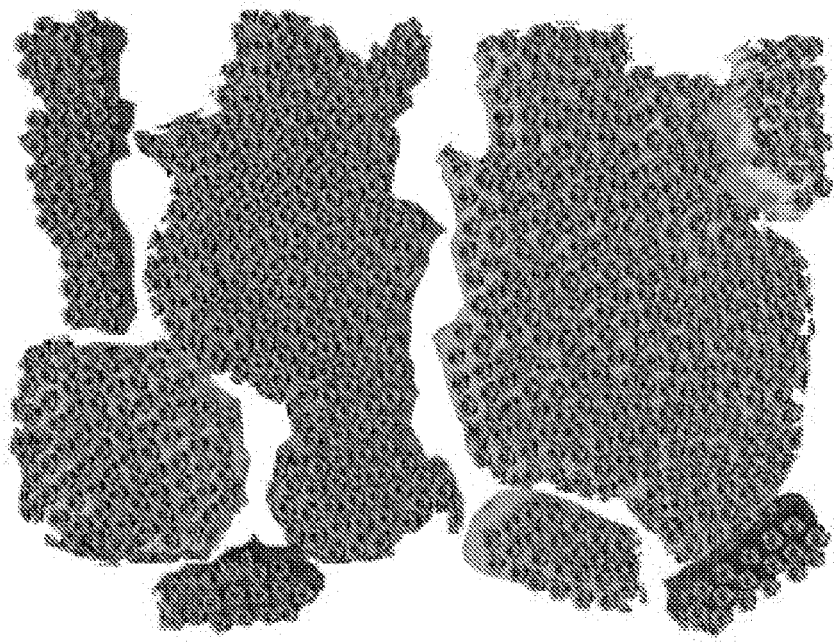

To convert vertex positions into a stand-alone format, we build a texture atlas for $M_{base}$, and convert the above local representation of vertex positions to locations in a geometry texture space. This is shown in FIGS. 14A and 14B. FIGS. 14A and 14B illustrate an example base bunny mesh parameterized over a low-distortion multi-chart texture atlas. FIG. 14A shows a base mesh decorated with flower geometry. FIG. 14B shows the corresponding texture atlas in which the charts are individually shaded for clarity.

After the texture atlas is built, we construct a shell space around $M_{base}$. This shell space is a thin volume between $M_{base}$ and one offset of it. Mapping the vertices from the geometry texture space to the shell space fixes the location of the vertices in 3D space, thus turning $M_{out}$ into a properly embedded mesh (e.g., as shown in FIG. 13C). To minimize the distortion introduced by this procedure, we describe a stretch-minimized shell mapping.

Shell Mapping—To model a geometric texture, a thin volume around an arbitrary mesh is defined. Existing approaches to mapping systematically create large distortions in curved regions (e.g., see FIG. 13A where the flower patterns are significantly enlarged). In this section, we alleviate this issue by enhancing, if not optimizing, a stretch metric on a tetrahedral mesh.

Stretch Metric on Tetrahedra—A shell map defines a piecewise linear, bijective mapping between shell space and texture space based on barycentric coordinates. However, with a piecewise-linear mapping between a triangle mesh and its parameterization, this bijection can have significant stretching in certain regions if no special care is taken. To restrain this occurrence, one can tweak the texture space coordinates in order to reduce a distortion measure.

Let g be the shell mapping defined between a point in shell space (x, y, z) (inside a tetrahedron $T_s=(v_1, v_2, v_3, v_4)$) to a point in texture space (u, v, w) (inside a tetrahedron $T_t=(q_1, q_2, q_3, q_4)$). Due its piecewise linear nature, the Jacobian of g (i.e., the deformation gradient)

$$J = \left[\frac{\partial g}{\partial x}, \frac{\partial g}{\partial y}, \frac{\partial g}{\partial z}\right]$$

is constant over $T_s$. Let $\pi_1$, $\pi_2$, and $\pi_3$ denote the three eigenvalues of the Cauchy deformation tensor $J^TJ$, representing the principal length dilation factors (called stretch). The root-mean-square stretch over all directions can now be computed as shown by equation (8):

$$L^2(g, T_s) = \sqrt{(\pi_1+\pi_2+\pi_3)/3} = \sqrt{(a_g+b_g+c_g)/3}, \quad (8)$$

$$\text{with } a_g = \frac{\partial g}{\partial x} \cdot \frac{\partial g}{\partial x}, b_g = \frac{\partial g}{\partial y} \cdot \frac{\partial g}{\partial y}, \text{ and } c_g = \frac{\partial g}{\partial z} \cdot \frac{\partial g}{\partial z}.$$

Assuming that the shell space comprises tetrahedra $\{T_t^i\}$, the total $L^2$ stretch is then given by equation (9):

$$L^2(g, M) = \sqrt{\sum_i (L^2(g, T_S^i))^2 |T_S^i| \bigg/ \sum_j |T_S^j|}, \quad (9)$$

where $|T_S^i|$ is the volume of tetrahedron $T_S^i$ in the shell space corresponding to the tetrahedron $T_t^i$ in texture space. The $L^2$-stretch value can be further normalized by multiplying it by $\sqrt{\Sigma_k |T_t^k|/\Sigma_m |T_S^m|}$ such that 1.0 is a lower bound for the stretch value.

Reduction Algorithm—To reduce $L^2(g, M)$, we start with the initial shell map and perform several enhancement iterations to reduce this stretch measure. For a shell map, the vertices on the offset surface are set to the same 2D texture value (u, v) as their originating vertices, varying by the height value w. To respect this layered mapping, we update the u and v texture coordinates of the vertices on the offset surface plane at each enhancement iteration. The update results are determined from a random line search, e.g., we perform enhancement of the stretch metric along a randomly chosen search direction in the (u, v) plane. (The texture coordinates of vertices on the lateral boundaries of the shell patch may be fixed to preserve continuity across patch boundaries.)

Figure 15A:
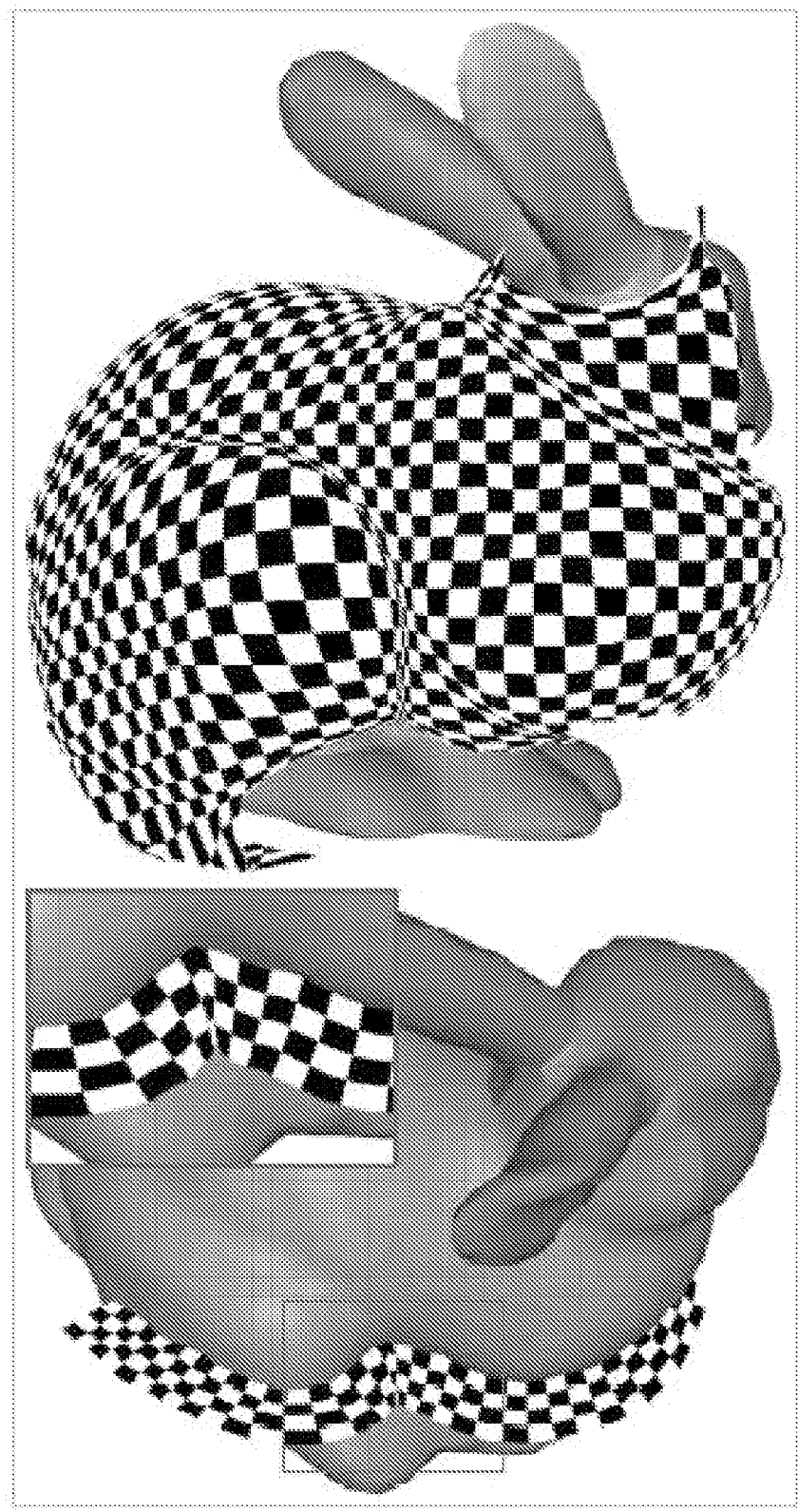
FIGS. 15A and 15B illustrate examples of shell map distortions on a curved surface before and after enhancement, respectively.
Figure 15B:
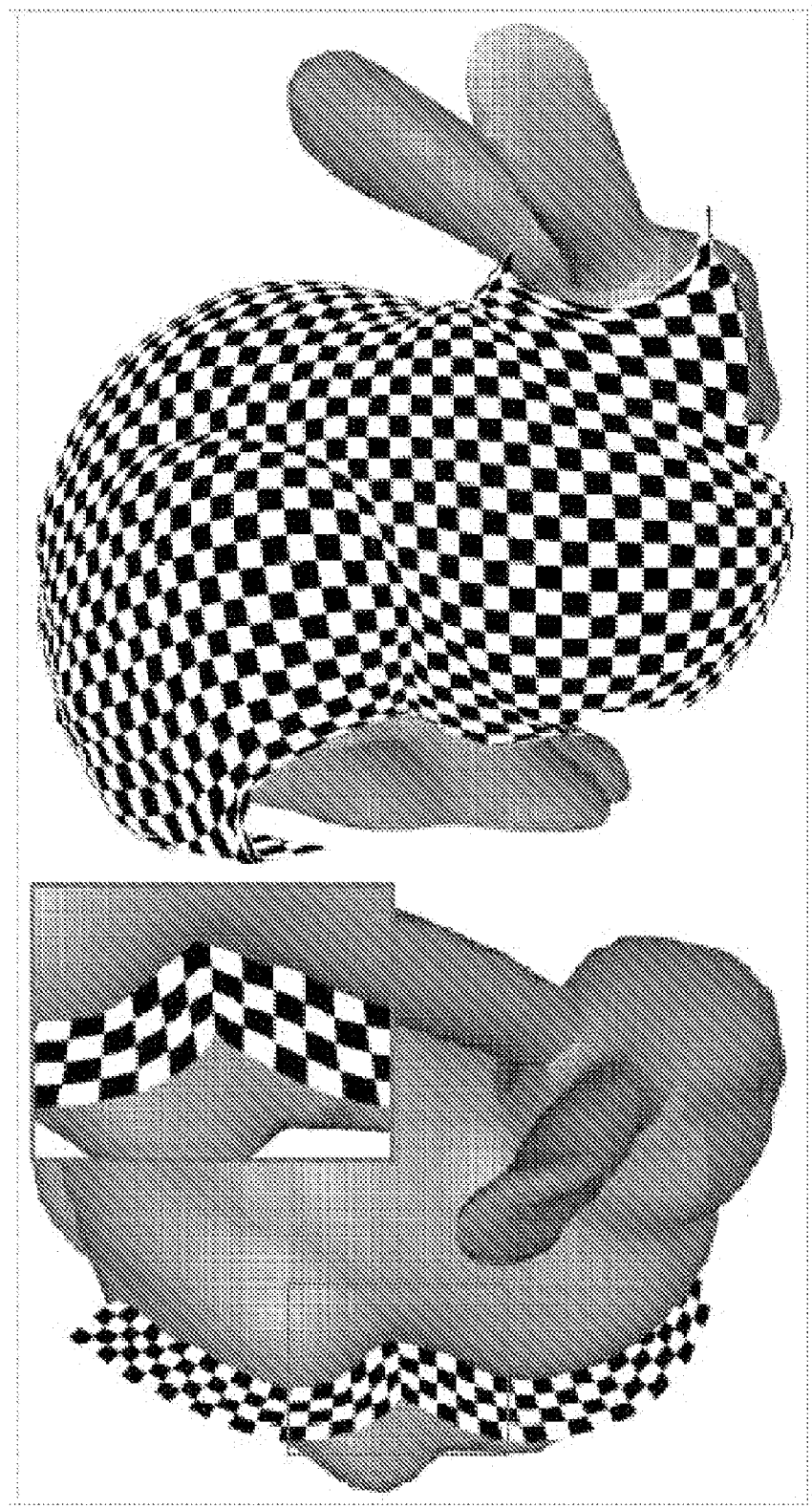

Results—With such an enhanced shell map, a user can enjoy a range of geometric detail modeling without having to painfully edit the details in order to visually compensate for distortion in curved areas. FIGS. 15A and 15B illustrate examples of shell map distortions on a curved surface before and after enhancement, respectively. FIG. 15A depicts a shell map distortion before optimization (L2=1.14). FIG. 15B depicts a shell map distortion after optimization (L2=1.08). On each figure, the upper half shows the offset surface distortion of the shell map using a regular checkerboard pattern, and the lower half shows a cut in the shell volume to inspect inner distortion. Generally, a low-distortion shell map, when applying a geometry texture over an arbitrary surface, can be used to support the editing of the output mesh through modification to $M_{base}$ without having to redo the whole synthesis.

EXAMPLE DEVICE IMPLEMENTATIONS FOR MESH QUILTING FOR GEOMETRIC TEXTURE SYNTHESIS

Figure 16:
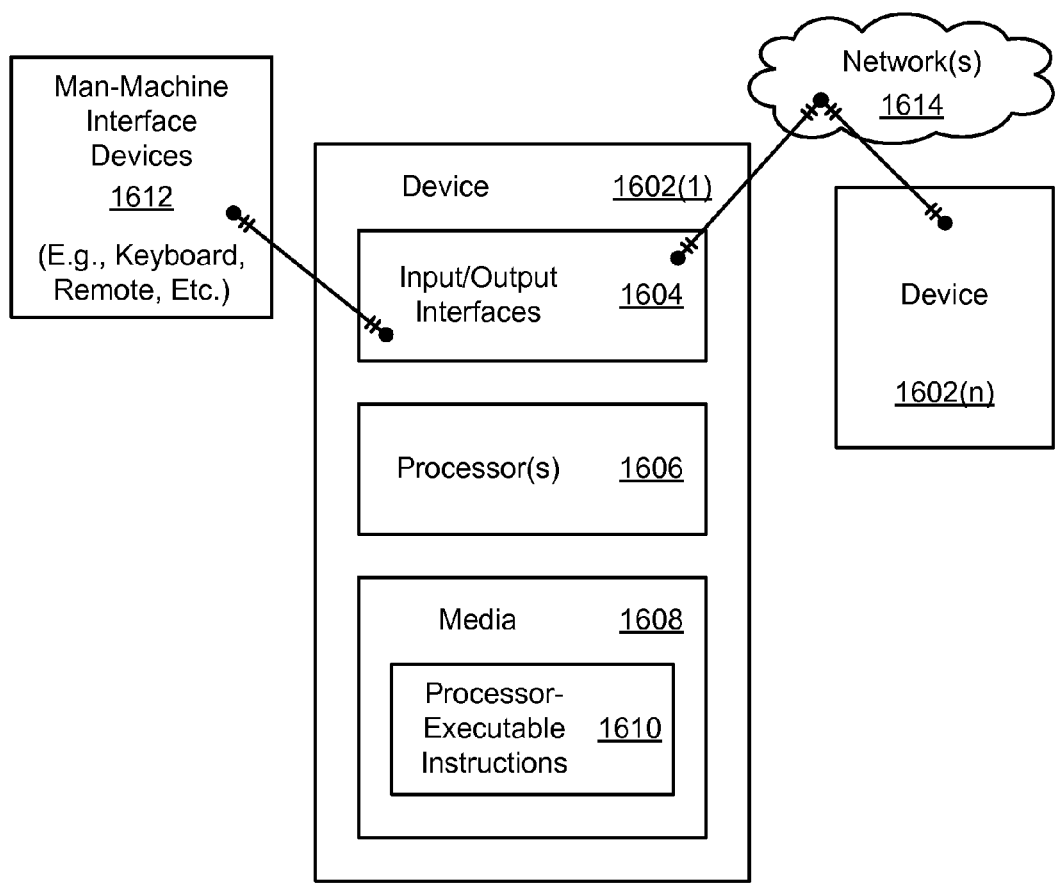
FIG. 16 is a block diagram of an example device that may be used to implement mesh quilting for geometric texture synthesis.

FIG. 16 is a block diagram of an example device 1602 that may be used to implement mesh quilting for geometric texture synthesis. Processing devices 102 (of FIG. 1) may be realized as devices 1602. As illustrated, two devices 1602(1) and 1602(n) are capable of engaging in communications via network(s) 1614. Although two devices 1602 are specifically shown, one or more than two devices 1602 may be employed, depending on implementation. Network(s) 1614 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth.

Generally, a device 1602 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 1602 includes one or more input/output (I/O) interfaces 1604, at least one processor 1606, and one or more media 1608. Media 1608 include processor-executable instructions 1610.

In an example embodiment of device 1602, I/O interfaces 1604 may include (i) a network interface for communicating across network 1614, (ii) a display device interface for displaying information on a display screen, (iii) one or more man-machine interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) man-machine interfaces include those that communicate by wire or wirelessly to man-machine interface devices 1612 (e.g., a keyboard, a remote, a mouse or other graphical pointing device, etc.).

Generally, processor 1606 is capable of executing, performing, and/or otherwise effectuating processor-executable instructions, such as processor-executable instructions 1610. Media 1608 is comprised of one or more processor-accessible media. In other words, media 1608 may include processor-executable instructions 1610 that are executable by processor 1606 to effectuate the performance of functions by device 1602. Processor-executable instructions may be embodied as software, firmware, hardware, fixed logic circuitry, some combination thereof, and so forth.

Thus, realizations for mesh quilting for geometric texture synthesis may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 1606 may be implemented using any applicable processing-capable technology, and it may be realized as a general purpose processor (e.g., a central processing unit (CPU), a controller, a graphics processing unit (GPU), a derivative thereof, and so forth. Media 1608 may be any available media that is included as part of and/or accessible by device 1602. It includes volatile and non-volatile media, removable and non-removable media, storage and transmission media (e.g., wireless or wired communication channels), hard-coded logic media, combinations thereof, and so forth. Media 1608 is tangible media when it is embodied as a manufacture and/or as a composition of matter. For example, media 1608 may include an array of disks or flash memory for longer-term mass storage of processor-executable instructions 1610, random access memory (RAM) for shorter-term storing of instructions that are currently being executed and/or otherwise processed, link(s) on network 1614 for transmitting communications, and so forth.

As specifically illustrated, media 1608 comprises at least processor-executable instructions 1610. Generally, processor-executable instructions 1610, when executed by processor 1606, enable device 1602 to perform the various functions described herein. Such functions include, but are not limited to: (i) those actions that are illustrated in flow diagram 300 (of FIG. 3); (ii) those actions implementable by the components of graphics component 104 (of FIG. 4); (iii) the procedures of phases 700-1100 (of FIGS. 1-11); (iv) the graphical renderings of other FIGS.; other algorithms described herein; combinations thereof; and so forth.

The devices, actions, aspects, features, functions, procedures, modules, data structures, phases, components, etc. of FIGS. 1-16 are illustrated in diagrams that are divided into multiple blocks and other elements. However, the order, interconnections, interrelationships, layout, etc. in which FIGS. 1-16 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for mesh quilting for geometric texture synthesis.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. One or more computer-readable storage media comprising computer-executable instructions that, when executed, direct a computer to perform acts comprising:
    matching geometry between a mesh texture swatch and a portion of a synthesized geometric texture;
    ascertaining correspondences between elements of the mesh texture swatch and the portion of the synthesized geometric texture;
    aligning ascertained corresponding elements of the mesh texture swatch and the portion of the synthesized geometric texture via local deformation to create a new patch; and
    merging the new patch into an output texture space to grow the synthesized geometric texture.

2. The computer-readable storage media as recited in claim 1, wherein the portion of the synthesized geometric texture comprises a seed region; and wherein the method further comprises:
    finding the seed region in the synthesized geometric texture responsive to a cell of a grid with the cell having at least one adjacent cell in which the synthesized geometric texture has already been grown using the mesh texture swatch.

3. The computer-readable storage media as recited in claim 1, wherein the mesh texture swatch comprises a set of vertex positions and a set of triangles.

4. The computer-readable storage media as recited in claim 1, wherein the matching comprises:
    determining multiple matching costs that are respectively associated with multiple translations of the mesh texture swatch; and
    selecting a translation of the multiple translations that is associated with a lowest matching cost of the multiple matching costs.

5. The computer-readable storage media as recited in claim 4, wherein the determining comprises:
    determining a distance between an output vertex of the synthesized geometric texture and an input face of the mesh texture swatch for each input face of the mesh texture swatch, the distance comprising a combination of geometric distance and normal distance.

6. The computer-readable storage media as recited in claim 1, wherein the ascertaining comprises:
    determining if input elements of the mesh texture swatch are related to output elements of the synthesized geometric texture based on an analysis involving at least one criterion.

7. The computer-readable storage media as recited in claim 6, wherein the at least one criterion involves vertex-face pairs with vertices being from the synthesized geometric texture and faces being from the mesh texture swatch.

8. The computer-readable storage media as recited in claim 6, wherein the determining comprises:
    determining a nearest input face of the mesh texture swatch for each output vertex of the synthesized geometric texture within an overlapping region to collect a set of vertex-face pairs; and
    tagging a given output element of the synthesized geometric texture as being related to a particular input element of the mesh texture swatch if there exists a vertex-face pair in the collected set of vertex-face pairs such that an output vertex of the vertex-face pair is part of the given output element and an input face of the vertex-face pair is part of the particular input element.

9. The computer-readable storage media as recited in claim 1, wherein the aligning comprises:
    deforming an input element of the mesh texture swatch and a corresponding output element of the synthesized geometric texture while attempting to satisfy position constraints and attempting to preserve local geometry details.

10. The computer-readable storage media as recited in claim 9, wherein the position constraints are reflected responsive to average points of vertex-face pairs, and the local geometry details are reflected responsive to Laplacian coordinates.

11. The computer-readable storage media as recited in claim 1, wherein the merging comprises:
    for each input element of the mesh texture swatch or output element of the synthesized geometric texture that lacks a corresponding output element or input element, respectively, adding the input element and the output element to the synthesized geometric texture.

12. The computer-readable storage media as recited in claim 1, wherein the merging comprises:
    for each input element of the mesh texture swatch or output element of the synthesized geometric texture that has a corresponding output element or input element, respectively:
        adding the input element to the synthesized geometric texture if its corresponding output element is entirely within an overlapping region; and
        adding the output element to the synthesized geometric texture if its corresponding input element is entirely within the overlapping region.

13. The computer-readable storage media as recited in claim 1, wherein the merging comprises:
for each input element of the mesh texture swatch and its corresponding output element of the synthesized geometric texture that are both partially within an overlapping region:
stitching the input element and the corresponding output element together into a combined element; and
adding the combined element to the synthesized geometric texture.

14. The computer-readable storage media as recited in claim 13, wherein the stitching comprises:
using a graph cut algorithm on an undirected flow network graph representing a dual graph adjacency between triangles.

15. The computer-readable storage media as recited in claim 1, wherein the output texture space is associated with a three-dimensional (3D) base mesh over which the synthesized geometric texture is grown.

16. The computer-readable storage media as recited in claim 15, further comprising:
building a texture atlas for the 3D base mesh; and
converting local representations of vertex positions for the synthesized geometric texture into locations in a geometry texture space.

17. The computer-readable storage media as recited in claim 15, further comprising:
reducing a stretching of the synthesized geometric texture, which is induced from a shell mapping between a shell space around the 3D base mesh and the output texture space, responsive to a stretch metric on tetrahedra.

18. The computer-readable storage media as recited in claim 17, wherein the reducing comprises:
minimizing a value of the stretch metric that is derived from a tetrahedron associated with the shell space and a tetrahedron associated with the output texture space.

19. A device comprising:
a geometry matcher to match geometry between a mesh texture swatch and a portion of a synthesized geometric texture;
a corresponding elements ascertainer to ascertain correspondences between elements of the mesh texture swatch and the portion of the synthesized geometric texture;
a corresponding elements aligner to align ascertained corresponding elements of the mesh texture swatch and the portion of the synthesized geometric texture via local deformation to create a new patch; and
a patch merger to merge the new patch into an output texture space to grow the synthesized geometric texture.

20. A system comprising:
a processor and memory;
a geometry matcher stored in the memory and executable on the processor to match geometry between a mesh texture swatch and a portion of a synthesized geometric texture;
a core elements ascertainer stored in the memory and executable on the processor to ascertain correspondences between elements of the mesh texture swatch and the portion of the synthesized geometric texture;
a corresponding elements aligner stored in the memory and executable on the processor to align ascertained corresponding elements of the mesh texture swatch and the portion of the synthesized geometric texture via local deformation to create a new patch; and
a patch merger stored in the memory and executable on the processor to merge the new patch into an output texture space to grow the synthesized geometric texture; and
a display that displays the output texture space.

* * * * *